(12) United States Patent
Lam et al.

(10) Patent No.: US 10,841,100 B2
(45) Date of Patent: Nov. 17, 2020

(54) DYNAMICALLY MANAGING EXCHANGES OF DATA USING A DISTRIBUTED LEDGER AND HOMOMORPHIC COMMITMENTS

(71) Applicant: The Toronto-Dominion Bank, Toronto (CA)

(72) Inventors: Brian Andrew Lam, Toronto (CA); Alexey Shpurov, Toronto (CA); Helena Litani, Vaughan (CA)

(73) Assignee: The Toronto-Dominion Bank, Toronto (CA)

( * ) Notice: Subject to any disclaimer, the term of this patent is extended or adjusted under 35 U.S.C. 154(b) by 277 days.

(21) Appl. No.: 16/057,791

(22) Filed: Aug. 7, 2018

(65) Prior Publication Data

US 2020/0052903 A1     Feb. 13, 2020

(51) Int. Cl.
*H04L 29/06*      (2006.01)
*H04L 9/32*       (2006.01)
*H04L 9/00*       (2006.01)

(52) U.S. Cl.
CPC ............ *H04L 9/3247* (2013.01); *H04L 9/008* (2013.01)

(58) Field of Classification Search
CPC ..... H04L 9/3247; H04L 9/008; H04L 9/3218; H04L 2209/38; H04L 9/3239
See application file for complete search history.

(56) References Cited

U.S. PATENT DOCUMENTS

| | | | | |
|---|---|---|---|---|
| 2012/0117049 A1* | 5/2012 | Zhou | ...................... | G06F 16/951 707/706 |
| 2016/0321751 A1* | 11/2016 | Creighton, IV | ....... | G06Q 40/04 |
| 2017/0236120 A1* | 8/2017 | Herlihy | .................... | G06F 21/57 705/67 |
| 2017/0250972 A1* | 8/2017 | Ronda | ................... | H04L 9/3236 |
| 2019/0012662 A1* | 1/2019 | Krellenstein | ......... | H04L 9/0643 |
| 2019/0109713 A1* | 4/2019 | Clark | ..................... | H04L 9/3239 |
| 2019/0363882 A1* | 11/2019 | Levy | ...................... | H04L 9/3297 |

OTHER PUBLICATIONS

Bunz et al., "Bulletproofs: Short Proofs for Confidential Transactions and More", 2018 IEEE Symposium on Security and Privacy (SP), Date of Conference: May 20-24, 2018.*

* cited by examiner

*Primary Examiner* — Morshed Mehedi

(74) *Attorney, Agent, or Firm* — Duane Morris LLP

(57) ABSTRACT

The disclosed exemplary embodiments include computer-implemented systems, apparatuses, and processes that dynamically manage exchanges of data using a cryptographically secure distributed ledger and homomorphic commitments. For example, and in response to an occurrence of a triggering event, an apparatus may obtain parameter values that characterize the data exchange, first commitment values representative of the parameter values, and a first digital signature. In response to a verification of the first digital signature, the apparatus may apply a second digital signature to commitment data that includes the first commitment values and a second commitment value representative of the first digital signature. The apparatus may transmit a signal that includes the commitment data and the second digital signature to a computing system, which generates an element of distributed ledger that includes the commitment data and the second digital signature in response to a verification of the second digital signature.

20 Claims, 8 Drawing Sheets

DYNAMICALLY MANAGING EXCHANGES OF DATA USING A DISTRIBUTED LEDGER AND HOMOMORPHIC COMMITMENTS

TECHNICAL FIELD

The disclosed embodiments generally relate to computer-implemented systems and processes that, among other things, dynamically manage exchanges of data using a cryptographically secure distributed ledger and homomorphic commitments.

BACKGROUND

Many distributed ledger data structures, such as blockchain ledgers, transparently and immutably record data in a decentralized and cryptographically secure format accessible to one or more network-connected devices and systems operating within a peer-to-peer network. Further, the incorporation of elements of code within these distributed ledger data structures, and the execution of the code elements by one or more of the peer devices or systems, establish a distributed smart contract capable of initiating exchanges of data based on programmatically detected events.

SUMMARY

In some examples, an apparatus includes a communications unit, a storage unit storing instructions, and at least one processor coupled to the communications unit and the storage unit. The at least one processor is configured to execute the instructions to obtain information associated with an exchange of data. The data exchange is capable of initiation by the apparatus in response to an occurrence of a triggering event, and the information includes parameter values that characterize the data exchange, first commitment values representative of the parameter values, and a first digital signature applied to the parameter values and the first commitment values. In response to a verification of the first digital signature, the at least one processor is further configured to store the information within a portion of the storage unit and apply a second digital signature to commitment data that includes the first commitment values and a second commitment value representative of the first digital signature. The at least one processor is also configured to generate and transmit, via the communications unit, a first signal that includes the commitment data and the second digital signature to a computing system. The first signal includes additional information that causes the computing system to execute instructions included within a distributed ledger, and the executed instructions cause the computing system to perform operations that, in response to a verification of the second digital signature, generate an element of distributed ledger that includes the commitment data and the second digital signature.

In other examples, a computer-implemented method includes obtaining, by at least one processor of an apparatus, information associated with an exchange of data. The data exchange is capable of initiation by the apparatus in response to an occurrence of a triggering event, and the information includes parameter values that characterize the data exchange, first commitment values representative of the parameter values, and a first digital signature applied to the parameter values and first commitment values. In response to a verification of the first digital signature, the method also includes, by the at least one processor, storing the information within a portion of a storage unit and applying a second digital signature to commitment data that includes the first commitment values and a second commitment value representative of the first digital signature. Further, the method includes generating and transmitting, by the at least one processor, a first signal that includes the commitment data and the second digital signature to a computing system. The first signal includes additional information that causes the computing system to execute instructions included within a distributed ledger, and the executed instructions cause the computing system to perform operations that, in response to a verification of the second digital signature, generate an element of distributed ledger that includes the commitment data and the second digital signature.

Further, in some examples, an apparatus includes a communications unit, a storage unit storing instructions, and at least one processor coupled to the communications unit and the storage unit. The at least one processor is configured to execute the instructions to receive, via the communications unit, a first signal from a first device that includes a request to an initiate an exchange of data. The data exchange is associated with an occurrence of a triggering event, and the at least one processor is further configured to perform operations that verify the occurrence of the triggering event associated with the data exchange. In response to the verification of the occurrence of the triggering event, the at least one processor is further configured to load, from the storage unit, information associated with the data exchange. The information includes parameter values that characterize the data exchange, first commitment values representative of the parameter values, and a first digital signature applied to the parameter values and first commitment values. The at least one processor is also configured to transmit the information to, and receive a response from, the first device via the communications unit. The response includes verification data indicative of an accuracy of the transmitted information, and based on the verification data, the at least one processor is further configured to perform additional operations that initiate the data exchange in accordance with one or more of the parameter values.

It is to be understood that both the foregoing general description and the following detailed description are exemplary and explanatory only and are not restrictive of the invention, as claimed. Further, the accompanying drawings, which are incorporated in and constitute a part of this specification, illustrate aspects of the present disclosure and together with the description, serve to explain principles of the disclosed embodiments as set forth in the accompanying claims.

DETAILED DESCRIPTION

Figure 1:
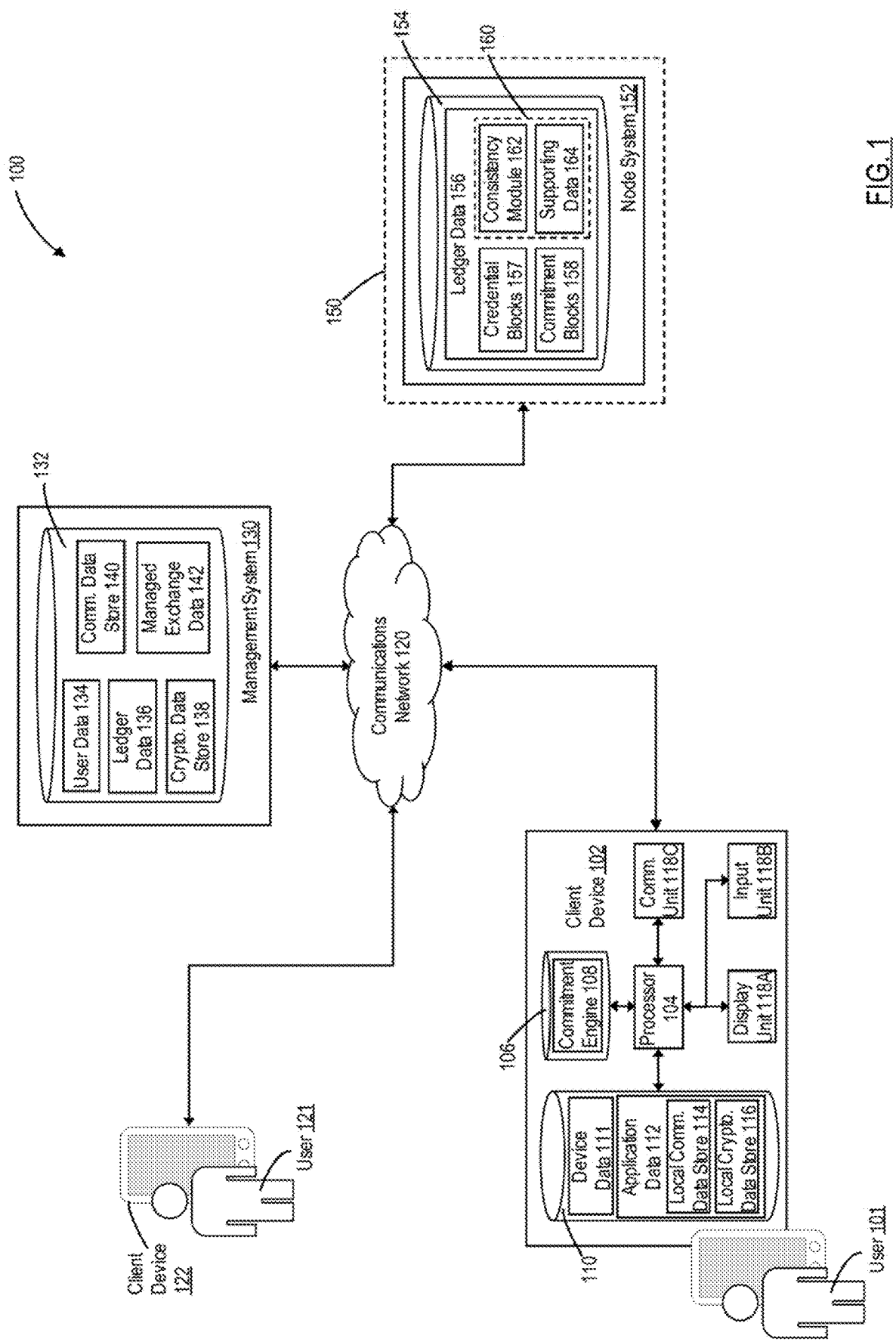
FIG. 1 is a diagram of an exemplary computing environment, consistent with disclosed embodiments.

Reference will now be made in detail to the disclosed embodiments, examples of which are illustrated in the accompanying drawings. The same reference numbers in the drawings and this disclosure are intended to refer to the same or like elements, components, and/or parts.

In this application, the use of the singular includes the plural unless specifically stated otherwise. In this application, the use of "or" means "and/or" unless stated otherwise. Furthermore, the use of the term "including," as well as other forms such as "includes" and "included," is not limiting. In addition, terms such as "element" or "component" encompass both elements and components comprising one unit, and elements and components that comprise more than one subunit, unless specifically stated otherwise. Additionally, the section headings used herein are for organizational purposes only and are not to be construed as limiting the described subject matter.

I. Exemplary Computing Environments

FIG. 1 is a diagram illustrating an exemplary computing environment 100, consistent with certain disclosed embodiments. As illustrated in FIG. 1, environment 100 may include, but is not limited to, one or more devices, such as client devices 102 and 122, a management system 130, and one or more node systems 150, such as node system 152. In some instances, client devices 102 and 122, management system 130, and node systems 150 may be interconnected through any appropriate combination of communications networks, such as network 120. Examples of network 120 include, but are not limited to, a wireless local area network (LAN), e.g., a "Wi-Fi" network, a network utilizing radio-frequency (RF) communication protocols, a Near Field Communication (NFC) network, a wireless Metropolitan Area Network (MAN) connecting multiple wireless LANs, and a wide area network (WAN), e.g., the Internet.

In some embodiments, client device 102 may include a computing device having one or more tangible, non-transitory memories that store data and/or software instructions, and one or more processors, e.g., processor 104, configured to execute the software instructions. The one or more tangible, non-transitory memories may, in some aspects, store application programs, application modules, and other elements of code executable by the one or more processors, e.g., within executable application data 106. For example, executable application data 106 may include one or more application programs, such as a commitment engine 108, associated with and provisioned to client device 102 by one or more network-connected computing systems operating within environment 100, such as management system 130. Executed application data 106 may also maintain one or more executable web browsers (e.g., Google Chrome™, etc.), one or more executable messaging applications (e.g., WhatsApp™, etc.), or application programs associated with a financial institution (e.g., a mobile payment application, etc.).

Referring back to FIG. 1, client device 102 may also establish and maintain, within the one or more tangible, non-transitory memories, one or more structured or unstructured data repositories or databases, e.g., data repository 110, that include device data 111 and application data 112. Device data 111 may include information that uniquely identifies client device 102, such as a media access control (MAC) address of client device 102 or an Internet Protocol (IP) address assigned to client device 102. In some instances, application data 112 may include information that facilitates, or supports, an execution of any of the application programs described herein, such as, supporting information that facilitates an authenticate an identity of a user operating client device 102, such as user 101. Examples of this supporting information include, but are not limited to, a digital identifier associated with user 101 (e.g., a digital token, a cryptogram, a cryptographic key, a random number, or other elements of cryptographic data), one or more alphanumeric login or authentication credentials assigned to user 101, or one or more biometric credentials of user 101, such as fingerprint data or a digital image of a portion of user 101's face, or other information facilitating a biometric or multi-factor authentication of user 101.

Additionally, or alternatively, application data 112 may also include, among other things, local commitment data store 114 and local cryptographic data store 116, each of which support an execution of commitment engine 108 and a performance of any of the exemplary commitment processes described herein. By way of example, local commitment data store 114 may identify and characterize the corresponding commitment scheme implemented by commitment engine 108, such as, but not limited to, a homomorphic Pedersen commitment of corresponding pairs of parameter values and random numbers using a discrete logarithmic scheme with specified generators or an elliptic curve. In some instances, local commitment data 114 may specify, for the homomorphic Pedersen commitment scheme, values establishing each of the generators of the elliptic curve and parameters of the discrete logarithmic scheme that associates the elliptic-curve generators. Further, and as described herein, the values of the elliptic-curve generators and additionally, or alternatively, the parameters that discretize the logarithmic scheme, may be established by management system 130 and provisioned to client device 102 (e.g., for storage within local commitment data 114) along with commitment engine 108, e.g., across network 120 through a secure programmatic interface.

Local cryptographic data store 116 may include, among other things, a public-private key pair generated by management system 130 and provisioned to client device 102, e.g., across network 120 through the secure programmatic interface. In some instances, and as described herein, management system 130 may generate the public and private cryptographic keys based on an application of a hash function to a concatenation of the login and authentication credentials associated with client device 102, either alone or further concatenated with a random number, during an initial registration of client device 102 with management system 130.

Additionally, in some examples, client device 102 may also include a display unit 118A configured to present interface elements to user 101, and an input unit 118B configured to receive input from user 101, e.g., in response to the interface elements presented through display unit 118A. By way of example, display unit 118A may include, but is not limited to, an LCD display unit or other appropriate type of display unit, and input unit 118B may include, but is not limited to, a keypad, keyboard, touchscreen, fingerprint scanner, voice activated control technologies, or appropriate type of input unit. Further, in additional instances (not depicted in FIG. 1), the functionalities of display unit 118A and input unit 118B may be combined into a single device, e.g., a pressure-sensitive touchscreen display unit that presents interface elements and receives input from user 101. Client device 102 may also include a communications unit 118C, such as a wireless transceiver device, coupled to processor 104 and configured by processor 104 to establish and maintain communications with network 120, e.g., via WiFi®, Bluetooth®, NFC, or cellular communications protocols (e.g., LTE®, CDMA®, GSM®, etc.).

As described herein, environment 100 may also include one or more additional client devices, such as client device 122, operated by user 101 or by other users, such as user 121. Client device 122 may also include a computing device having one or more tangible, non-transitory memories that store data and/or software instructions, and one or more processors configured to execute the software instructions. The one or more tangible, non-transitory memories may, in some aspects, store software applications, application modules, and other elements of code executable by the one or more processors, such as, but not limited to, commitment engine 108 and other of the exemplary application programs described herein. Further, client device 122 may establish and maintain, within the one or more tangible, non-transitory memories, one or more data repositories, the structured or unstructured data records of which may include any of the exemplary elements of device data, application data, loam commitment information, or local cryptographic information described herein.

Examples of client device 102 or 122 may include, but are not limited to, a personal computer, a laptop computer, a tablet computer, a notebook computer, a hand-held computer, a personal digital assistant, a portable navigation device, a mobile phone, a smart phone, a wearable computing device (e.g., a smart watch, a wearable activity monitor, wearable smart jewelry, and glasses and other optical devices that include optical head-mounted displays (OHMDs), an embedded computing device (e.g., in communication with a smart textile or electronic fabric), and any other type of computing device that may be configured to store data and software instructions, execute software instructions to perform operations, and/or display information on an interface module, consistent with disclosed embodiments. In some instances, user 101 may operate client device 102 and user 121 may operate client device 102, which may cause client device 102 or client device 122 to perform one or more operations consistent with the disclosed embodiments.

Referring back to FIG. 1, management system 130 may represent a computing system that includes one or more servers (not depicted in FIG. 1) and tangible, non-transitory memory devices storing executable code and application modules. Further, the servers may each include one or more processor-based computing devices, which may be configured to execute portions of the stored code or application modules to perform operations consistent with the disclosed embodiments. In other instances, and consistent with the disclosed embodiments, management system 130 may correspond to a distributed system that includes computing components distributed across one or more networks, such as network 120, or other networks, such as those provided or maintained by cloud-service providers (e.g., Google Cloud™, Microsoft Azure™, etc.). Additionally, in some instances, management system 130 can be incorporated into a single computing system or incorporated into multiple computing systems.

Referring back to FIG. 1, management system 130 may establish and maintain, within one or more tangible, non-transitory memories, one or more structured or unstructured data repositories or databases, such as data repository 132. By way of example, data repository 132 may include, but is not limited to, user data 134, ledger data 136, cryptographic data store 138, commitment data store 140, and managed exchange data 142.

In some instances, user data 134 may include data that identifies and characterizes one or more users of management system 130, such as user 101 or user 121. For example, and for a corresponding one of the users, such as user 101, user data 134 may specify a unique digital identifier of user 101 (e.g., the digital token, cryptogram, cryptographic key, random number, etc.), a login credential of user 101 (e.g., an alphanumeric user name assigned to user 101 by management system 130, etc.), and/or one or more authentication credentials of user 101 (e.g., an alphanumeric password, a biometric credential, such as a fingerprint scan or a facial image, etc.). As described herein, the digital identifier, the login credential, and/or the one or more authentication credentials of user 101 may also be linked within user data 134 to an identifier of one or more devices operated by or associated with user 101, such as a unique network address (e.g., an assigned Internet Protocol (IP) address or a media access control (MAC) address) of client device 102.

Further, and for each of the users of management system 130, user data 134 may also associate the digital identifier, the login credential, the one or more authentication credentials, and/or the one or more device identifiers with one or more corresponding government-issued identifiers. The one or more government-issued identifiers may be issued to a corresponding user of management system 130 by a governmental entity, and examples of the government-issued identifiers may include, but are not limited to, a driver's license number, a social security number or a tax identification number, or an identifier of a passport.

In some examples, the login credential and the one or more authentication credentials may be selected by a user of management system 130, such as user 101, during an initial registration process (e.g., based on input provided to client device 102 in response to a digital interface associated with management system 130), or may be assigned to user 101 by management system 130 during the initial registration process. Further, and by way of example, one or more of the government-issued identifiers, as described herein, may also be provided by corresponding users of management system 130, such as user 101, during the initial registration processes.

In additional instances, one or more of the user-specific digital identifiers may be generated by management system 130 during the initial registration process, e.g., based on an application of an appropriate tokenization, cryptogram-generation, or key-generation scheme to corresponding portions of the login credentials, the authentication credentials, or the government-issued identifiers. Further, one or more elements of a cryptographically secure distributed-ledger data structure, such as a local copy of one or more credential ledger blocks of a distributed ledger maintained within ledger data 136, may identify the digital identifier of user 101 and may link that digital identifier to the corresponding login credential of user 101, to the one or more corresponding authentication credentials of user 101, and/or to the one or more government-issued identifiers of user 101.

Referring back to FIG. 1, cryptographic data store 138 may include a pair of public and private cryptographic keys associated with management system 130 and in some instances, with one or more users of management system 130, such as user 101. Further, commitment data store 140 may include information that identifies and characterizes a corresponding commitment scheme implemented by management system 130, which may include, but is not limited to, the homomorphic Pedersen commitment described herein. In some instances, the information maintained within commitment data store 140 may specify, for the homomorphic Pedersen commitment, values of the generators of the elliptic curve and parameters of the discrete logarithmic scheme that associates the values of the elliptic-curve generators. As described herein, management system 130 may perform operations that establish the values of the elliptic-curve generators and additionally, or alternatively, the parameters that discretize the logarithmic scheme, and management system 130 may perform operations that provision all, or a portion, of the information maintained within commitment data store 140 to client device 102 (e.g., for storage within local commitment data store 114), e.g., across network 120 through a secure programmatic interface.

Managed exchange data 142 may include information that identifies and characterizes one or more exchanges of data capable of initiation by management system 130 in response to a detected, and verified, occurrence of a triggering event. By way of example, and for each of one or more data exchanges, management system 130 may maintain, within managed exchange data 142, digitally signed value of parameters that characterize the data exchange and digitally signed elements of commitment data associated with corresponding ones of the parameter values, along with data that identifies a corresponding one of the users of management system 130 (e.g., the digital identifier and/or alphanumeric login credential of user 101, who specified the parameter values an input to client device 102) and data that identifies a device associated with the corresponding user (e.g., the IP or MAC address of client device 102, etc.). The elements of commitment data may include, but are not limited to, commitment values representative of corresponding ones of the parameter values and in instances, one or more random numbers generated during the computation of each of the commitment values, such as, but not limited to, the Pedersen commitments described herein.

In some instances, each of node systems 150, such as, but not limited to, node system 152, may correspond to a computing system that includes one or more servers and tangible, non-transitory memory devices storing executable code and application modules. The servers may, for example, each include one or more processor-based computing devices, which may be configured to execute portions of the stored code or application modules to perform operations consistent with the disclosed embodiments. In some instances, and consistent with the disclosed embodiments, one or more of node systems 150 (e.g., node system 152) may correspond to a distributed system that includes computing components distributed across one or more networks, such as network 120, or other networks, such as those provided or maintained by cloud-service providers (e.g., Google Cloud™, Microsoft Azure™, etc.).

In some examples, node system 152 may establish and maintain, within the one or more tangible, non-tangible memories, one or more structured or unstructured data repositories or databases, such as data repository 154. For instances, data repository 154 may include ledger data 156 that maintains a local copy of a cryptographically secure distributed ledger accessible to node systems 150, such as, but not limited to, a publicly accessible distributed ledger (e.g., accessible to node systems 150 and additional or alternate network-connected devices and system) or a permissioned distributed ledger accessible to a selected number of network-connected devices and systems that include node systems 150 (e.g., that collectively establish a permissioned blockchain network).

The distributed ledger may include one or more ledger blocks (e.g., credential blocks 157) that immutably record and track digital identifiers, login credentials, and/or authentication credentials associated with, selected by, or assigned to one or more users of management system 130, such as user 101 or user 121. As described herein, the login credentials may include, but are not limited to, an alphanumeric user name assigned to or selected by each of the users of management system 130, and the corresponding authentication credentials may include, but are not limited to, an alphanumeric password or a biometric credential, such as facial image data or a fingerprint scan. Further, in some instances, credential blocks 157 may also link the login and authentication credentials for one or more of the users to a corresponding digital identifier, such as, but not limited to, a digital token, cryptogram, or cryptographic key, and to one or more corresponding government-issued identifiers, such as a driver's license number, a social security number or a tax identification number, or a passport number.

The distributed ledger may also include one or more ledger blocks (e.g., commitment blocks 158) that immutably record values of commitments characterizing exchanges of data capable of initiation by management system 130 in response to a detected, and verified, occurrence of a triggering event. In some instances, the commitment values may be representative of parameter values that characterize corresponding ones of the data exchanges, and additionally, or alternatively, a digital signature applied to the first commitment values by a corresponding network-connected device, such as client device 102 operated by user 101. Further, the immutably recorded commitment values characterizing each of the data exchanges may also be digitally signed by management system 130 (e.g., using a private cryptographic key of management system 130) prior to their respective broadcast each of node systems 150, including node system 152.

In additional instances, the distributed ledger may also include one or more ledger blocks that maintain executable elements of code, such as software modules or executable scripts, that, when executed by the node system 152 in conjunction with supporting data, perform operations consistent with a distributed smart contract (e.g., smart contract ledger blocks 160). By way of example, smart contract ledger blocks 160 may include a consistency module 162 that, when executed by node system 152 (e.g., by one or more processors or through an instantiated virtual machine), performs operations that, for a received set of commitment values, verify the digital signature applied by management system 130, e.g., based on a public cryptographic key of management system 130).

In some examples, executed consistency module 162 may perform additional operations that verify a consistency between one or more subsets of digitally signed commitment values. For instance, and as described herein, the digitally signed commitment values may correspond to homomorphic Pedersen commitment values generated by a corresponding network-connected client device, such as client device 102, using any of the exemplary processes described herein. In some instances, executed consistency module 162 may perform operations verify the consistency or all, or a subset, of the homomorphic Pedersen commitment values based on an application of a zero-knowledge equality proof to these commitment values.

Smart contract ledger blocks 160 may also include supporting data 164 that supports the operations performed by consistency module 162. Examples of supporting data 164 may include, but are not limited to, data facilitating the application of the zero-knowledge equality proof to corresponding portions of digitally signed Pedersen commitment values; a public key associated with management system 130, which executed consistency module 162 may leverage to verify the digital signature applied to digitally signed commitment values received at node system 152 (and at other ones of node systems 150) from management system 130; a public cryptographic key associated with the distributed smart contract, which may be provided to each of the client devices 102 and 122 and to management system 130, e.g., through a secure programmatic interface; and a private cryptographic key leveraged by node system 152 to digitally sign generated data.

II. Exemplary Computer-Implemented Processes for Dynamically Managing Exchanges of Data Using a Homomorphic Commitments and a Cryptographically Secure Distributed Ledger In some instances, and as described herein, a cryptographically secure distributed ledger, such as a blockchain ledger, may immutably record and maintain values of one or more parameters that characterize an exchange of data. By way of example, the data exchange may be initiated and executed subsequent to a detected, and verified, occurrence of a predetermined triggering event, and the parameter values that characterize the data exchange may be generated by one or more network-connected devices or systems operating within environment 100, such as client device 102 or management system 130. These network-connected devices or systems, e.g., "source" devices or systems, may perform operations that package the generated parameter values into corresponding elements of transaction data, and further, that apply one or more digital signatures to all or a portion of the transaction data, and that generate hash values representative of the transaction data based on an application of one or more hash algorithms to corresponding portions of the transaction data, either individually or as a concatenation with the applied digital signatures.

The source device or system may, in some instances, also perform operations that broadcast the packaged transaction data, along with the one or more applied digital signatures and the generated hash values, to one or more node systems operating within environment 100, such as node systems 150 of FIG. 1. As described herein, each of node systems 150, may perform operations that verify an identity of the source device or system (e.g., based on a verification of the one or more applied digital signatures using a public cryptographic key of the source device or system) and further, verify an integrity of the digitally signed hash value (e.g., based on a recalculation of the generated hash values). Further, each of node systems 150, include node system 152, may perform additional, consensus-based operations that incorporate the digitally signed and hashed transaction data into a new element of the distributed ledger, e.g., a new ledger block of the distributed ledger, and that generate a latest, longest version of the distributed ledger data structure that includes the newly added ledger element for circulation among node systems 150.

The distributed ledger may provide an immutable, time-stamped record of the parameter values that characterize the data exchange and further, may establish a temporal evolution of modifications to these parameter values prior to the detection, and verification, of the occurrence of the event that triggers the initiation and execution of the data exchange. These distributed ledger data structures also maintain the time-stamped record of the parameter values (and other immutably recorded and tracked data) in a native form and without any obfuscation, tokenization, or data encryption (e.g., in a transparent form). As such, the time-stamped record of the parameters may be visible to, and verifiable by, any network-connected device or system capable of accessing and inspecting the distributed ledger, such as the source device or system described herein. Additionally, the integrity of the time-stamped record of the parameter values can be verified further by re-computing the hash value representative of the time-stamped record and comparing the re-computed hash value against the hash value maintained within the distributed ledger data structure.

Although these distributed ledger data structures maintain an immutable and transparent record of the parameter values that characterize a corresponding data exchange, their inherently transparent and decentralized nature may be incompatible with certain exchanges of data, especially those data exchanges associated with, or characterized by, heightened requirements for data privacy. For example, a user of a network-connected device operating within environment 100, such as user 101 that operates client device 102, may engage an attorney (e.g., user 121 of FIG. 1) to prepare a testamentary instrument, such as a will, that transfers an interest in, or a right to, an asset or property held by user 101 to one or more beneficiaries. In some instances, the specified transfer of the interests and/or rights from user 101 to the corresponding beneficiaries may be facilitated by an exchange of data that, when initiated subsequent to a death of user 101 (e.g., the detected and verified occurrence of the triggering event), transfers the interest or right in the asset or property from user 101 to beneficiaries in accordance with a specified distribution scheme.

By way of example, and without limitation, user 101 may hold a financial services account (e.g., an investment account maintained by a financial institution associated with management system 130), and user 101's testamentary instrument may distribute a final balance held within the investment account to various beneficiaries in accordance with the specified allocation scheme. The specified distribution scheme may, for instance, identify a first allocation of sixty-five percent of the final balance of a spouse of user 101 and a second allocation of thirty-five percent of the final balance to a child of user 101. In some instances, and as described herein, a network-connected computing system, such as management system 130 of FIG. 1, may, upon verification of the death of user 101, perform operations that initiate exchanges of data to transfer funds from the investment account of user 101 to corresponding financial services account held by each of the beneficiaries in accordance with the specified distribution scheme.

Further, and to generate an immutable record of the terms of the testamentary instrument, client device 102 may perform operations that, alone or in conjunction with management system 130, submit digitally signed and hashed transaction data characterizing the terms of the testamentary instrument to each of node systems 150 for inclusion within elements of the cryptographically secure, decentralized, and transparent distributed ledger described herein. For example, the transaction data may include, but is not limited to, asset data characterizing the identified assets (e.g., the investment account held by user 101), beneficiary data identifying each of the specified beneficiaries, and the specified distribution scheme associated with the assert and the beneficiaries. Each of node systems 150, including node system 152, may perform any of the consensus-based processes described herein to verify an identity of a source of the transaction data (e.g., based on the applied digital signatures) and an integrity of the transaction data (e.g., based on the corresponding hash value), and to incorporate the digitally signed and hash transaction data within a new element of the distributed ledger data structure.

In some instances, however, the transparent and decentralized nature of the distributed ledger may be incompatible with an inherent, a desired, or an imposed, confidentiality of user 101's testamentary instrument. For example, while the distributed ledger may establish an immutable record of certain terms of this testamentary instrument, such as, but not limited to, the identified assets, the specified beneficiaries, and the specified allocation schemes, user 101 may desire to maintain a confidentiality of these terms, or may be required to maintain the confidentiality of these terms by a governmental or regulatory entity, until that testamentary instrument is publicly read and probated, e.g., by a court of competent jurisdiction.

Further, while the maintained hash value can ensure an integrity of the transaction data recorded within the distributed ledger data structure, these hash values, and the corresponding hash algorithms, are often themselves incapable of verifying a consistency among certain elements of the recorded transaction data. For example, the recorded transaction data may include the specified distribution scheme for a particular asset (e.g., the investment account held by user 101), and the specified distribution scheme may identify fractional portions of that particular asset distributable to corresponding beneficiaries (e.g., a distribution of 65% of the balance of the investment account to a spouse and 35% of the balance of a child). As described herein, the hash value associated with the recorded transaction may enable a network-connected device or system, such as management system 130 or client devices 102 or 122, to perform operations that detect a modification to the specified distribution scheme subsequent to its recordation within the distributed ledger.

The hash value associated with the recorded transaction data does not, however, enable a network-connected device or system, such as one of node systems 150, to verify one or more consistency conditions associated with the transaction data prior to recordation within the distributed ledger. For example, while the corresponding hash function or algorithm may map input data of an arbitrary size or composition to output data (e.g., the hash value) having a specified size or composition, the corresponding hash function or algorithm does not represent a homomorphic mapping of the input data into the output data, and as such, does not preserve in the output data any relationship (e.g., an associative relationship, etc.) between elements of the input data. Indeed, the application of the corresponding hash function or algorithm the fractional allocations within the specified allocation scheme cannot verify a consistency condition associated with the specified allocation scheme, e.g., that these fractional allocations sum to unity.

In certain exemplary embodiments, as described herein, one or more network-connected devices or systems, such as client device 102 and management system 130, may perform operations that compute homomorphic commitment values representing corresponding ones of parameter values characterizing an exchange of data capable of initiation by management system 130, e.g., a data exchange facilitating a distribution of assets in accordance with a testamentary instrument generated by, or on behalf of user 101. In one example, the homomorphic commitment values may be computed in accordance with a Pedersen commitment scheme, which establishes a homomorphic mapping of each parameter value (and a corresponding random number) based on a scalar multiplication of generators of an elliptic curve related through a corresponding discrete logarithm.

By way of example, and for a particular one of the parameter values, e.g., parameter value $p_i$, the Pedersen commitment value may be calculated as follows:

$$C(p_i, r_i) = r_i H + p_i G,$$

where C corresponds to the Pedersen commitment value representing parameter value $p_i$, $r_i$ corresponds to a random number generated for parameter value $p_i$, G corresponds to an agreed-upon generator value for the elliptic curve, and H corresponds to an additional generator for the elliptic curve that satisfies the discrete logarithm H=q G. In some instances, certain parameters of the Pedersen commitment scheme, such as, but not limited to, the values of G, q, and H, may be established by management system 130 and provisioned to client devices 102 and 122 (e.g., for storage within a corresponding portion of local commitment data store 114 of FIG. 1) and to each of node systems 150 (e.g., for recordation within a corresponding portion of supporting data 164 of FIG. 1).

In some instances, the computed values of the Pedersen commitment each represent a homomorphic commitment, and a sum of a subset of the commitment values computed for corresponding pairs of parameter values (e.g., $p_i$) and random number (e.g., $r_i$) is equivalent to an additional commitment value computed for a sum of the corresponding parameter values and a sum of the random number, as described below:

$$C(p_1,r_1)+C(p_2,r_2)+\ldots+C(p_{N-1},r_{N-1})+C(p_N,r_N)=C$$
$$((p_1+p_2+\ldots+p_{N-1}+p_N),(r_1+r_2+\ldots+r_{N-1}+r_N)).$$

Further, and due to the homomorphic properties of the computed Pedersen commitment values, a zero-knowledge equality proof may be valid for all, or a subset, of the computed Pedersen commitment values.

Based on the homomorphic properties of the Pedersen commitment values, and on the validity of the zero-knowledge equality proof for these commitment values, the disclosed exemplary embodiments may enable management system 130 and additionally or alternatively, one or more of node systems 150 (e.g., based on an execution of consistency module 162 maintained with smart contract ledger blocks 160 of FIG. 1), to verify the one or more consistency conditions associated with the transaction data based not on any analysis of the underlying parameter values, but instead based on an application of the zero-knowledge equality proof to the Pedersen commitment values representative of the parameter values. For example, management system 130 and/or one or more of node systems 150 may perform operations that, for each asset identified within the testamentary instrument of user 101, confirm that the fractional allocations to the corresponding beneficiaries sum to unity based on operations applied to the Pedersen commitment values that represent these fractional allocations.

Further, and based on the homomorphic properties of the Pedersen commitment values, and on the validity of the zero-knowledge equality proof for these commitment values, the disclosed exemplary embodiments may enable one or more of node systems 150 to perform operations that record the commitment values (e.g., associated with the parameter values specified within the testamentary instrument of user 101) within corresponding portions of the distributed ledger data structure, e.g., within commitment blocks 158 of the distributed ledger of FIG. 1. Further, the disclosed embodiments may also enable management system 130 to perform operations that store the digitally signed transaction data, which includes the actual parameter values, within a secure portion of a locally accessible memory, e.g., within managed exchange data 142 of FIG. 1.

The storage of the transaction data (including the actual parameter values) within the locally accessible memory of management system 130 may maintain a confidentiality of certain terms of within user 101's testamentary instrument, such as, but not limited to, the identified assets, the specified beneficiaries, and the specified distribution schemes, while enabling other parties to confirm the accuracy and the integrity of the stored transaction data based on an analysis of the publicly accessible commitment values recorded onto the distributed ledger. Certain of these disclosed exemplary embodiments, which facilitate a maintenance of a confidentiality of parameter values characterizing an exchange of data, and which facilitate an immutable recordation of commitment values representation of the confidential parameter values within a cryptographically secure distributed ledger data structure, can be implemented in addition to, or as an alternate to, conventional processes that record transparently the actual parameter values characterizing an exchange of data within a cryptographically secure distributed ledger data structure, and that establish an integrity of the actual parameter values based on an application of one or more hash functions to these actual recorded parameter values.

In some instances, and to initiate a performance of one or more of the exemplary commitment processes described herein, user 101 may provide input to client device 102 (e.g., via input unit 118B of FIG. 1) that requests an execution of a corresponding application program, such as commitment engine 108 of FIG. 1. As described herein, commitment engine 108 may be associated with, and provisioned to client device 102 by management system 130, and upon execution by client device 102, commitment engine 108 may generate and render one or more interface elements for presentation within a corresponding digital interface, e.g., through display unit 118A. The digital interface may include interface elements that prompt user 101 to provide input to client device 102, via input unit 118B, that specifies a corresponding digital identifier, and additionally, or alternatively, a corresponding a login credential (e.g., an alphanumeric login credential of user 101) and one or more corresponding authentication credentials (e.g., an alphanumeric password of user 101, a biometric credential of user 101, etc.).

Based on the specified digital identifier, or the login and authentication credentials, executed commitment engine 108 may perform operations that authenticate an identity of user 101 based locally stored credential data (e.g., as maintained within corresponding portions of device data 111 and application data 112). In other instances, and consistent with the disclosed exemplary embodiments, executed commitment engine 108 may perform operations that cause client device to transmit the specified digital identifier and additionally, or alternatively, one or more of the specified login or authentication credentials, across network 120 to management system 130, which may perform operations that authenticate the identity of user 101 based locally maintained credential data (e.g., as maintained within user data 134), or based on credential data maintained on behalf of user 101 within ledger blocks of a distributed ledger (e.g., as maintained within ledger data 136).

In response to a successful authentication of the identity of user 101, executed commitment engine 108 may perform operations that generate and present, within the digital interface, additional interface elements that prompt user 101 to provide input data, e.g., user input 202, that identifies and characterizes a testamentary instrument, such as a will, drafted on behalf of and executed user 101. By way of example, the testamentary instrument may include information that identifies and characterizes one or more assets held by user 101, such as, but not limited to, account numbers associated with financial services accounts held by user 101 (e.g., as issued by user 101 by one or more financial institution), public cryptographic keys that identify and characterize one or more cryptocurrency accounts held by user 101, and other information identifying real estate or other tangible elements of physical property (e.g., data identifying a recordation of a deed for real estate, a vehicle identification number, a title or registration number for a vehicle, etc.).

Further, the testamentary instrument may also include information that characterizes a distribution of the identified assets (e.g., as specified within the asset data) to corresponding beneficiaries. By way of example, the testamentary instrument may specify a fractional distribution of an asset, or proceeds from a sale of that asset, to a corresponding set of beneficiaries, and the distribution data may identify the corresponding asset (e.g., based on the identifiers described above) and each of the corresponding beneficiaries (e.g., based on an appropriate governmental identifier, such as a driver's license number, a social security number, or a passport number), along with a fraction of that asset allocated to each of the beneficiaries. In other examples, the testamentary instrument may include one or more specific bequests of assets to corresponding beneficiaries, such as, but not limited to, a distribution of a specific amount of funds to from an account to a corresponding beneficiary, or a distribution of a particular parcel of real estate to that corresponding beneficiary.

In further instances, the testamentary instrument may also condition a distribution of a particular asset (or portion of an asset) to a particular beneficiary on a satisfaction of one, or more, distribution conditions. Examples of these distribution conditions include, but are not limited to, an age of the particular beneficiary, a marital status of the particular beneficiary, an existence of children, or a residence of the particular beneficiary. The disclosed embodiments are, however, not limited to these exemplary assets, distributions, or conditions, and in other instances, the testamentary instrument executed by user 101 may include information identifying any additional, or alternate asset held by user 101, information characterizing any additional, or alternate, distribution of assets to one or more beneficiaries, or information identifying any additional, or alternate, conditions on these distributions, including an absence of any condition.

Figure 2A:
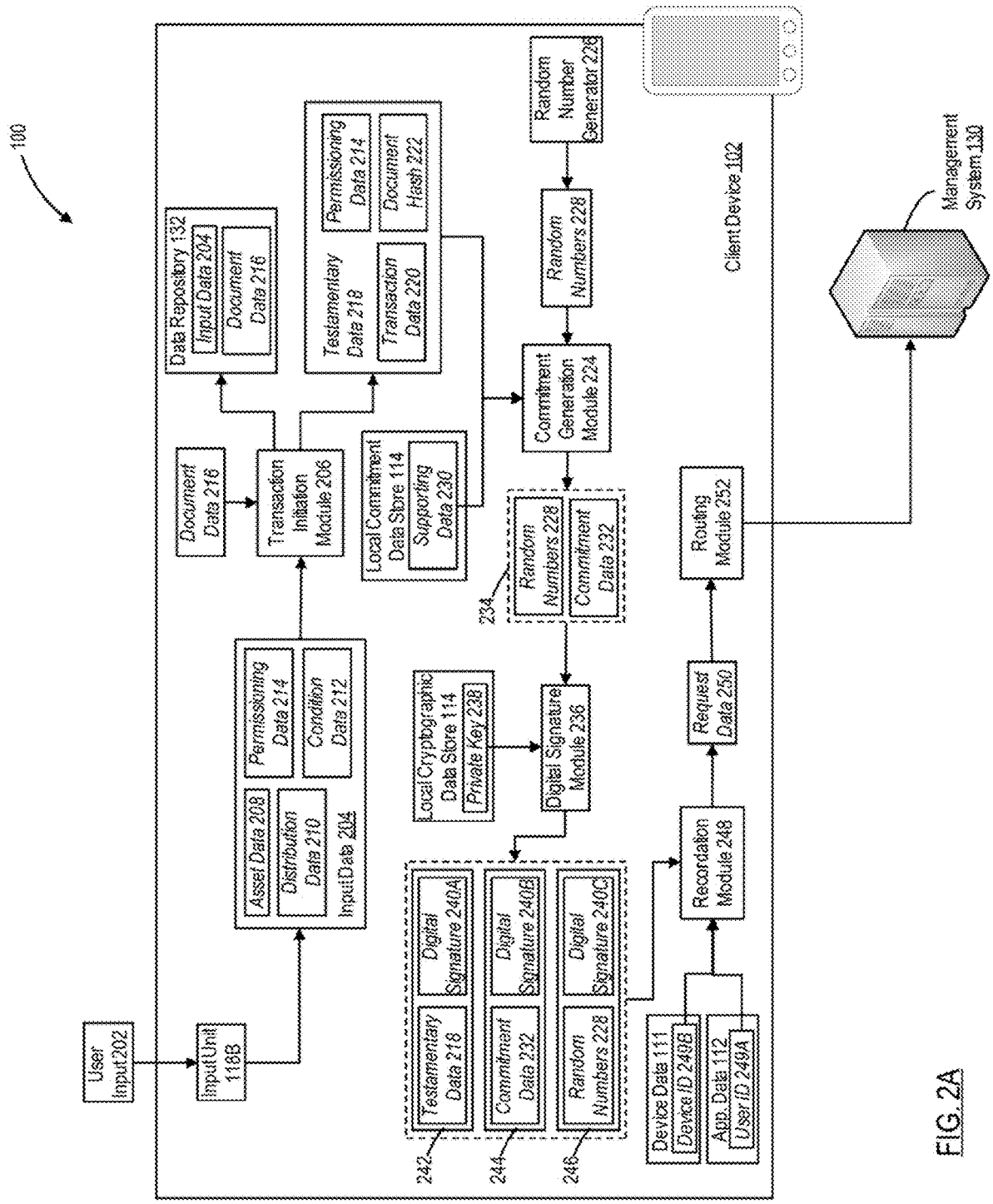
FIGS. 2A, 2B, 2C, 3A, and 3B are diagrams illustrating portions of an exemplary graphical user interface, consistent with the disclosed embodiments.

Referring to FIG. 2A, client device 102 may receive user input 202 through a corresponding input unit, e.g., input unit 118B of client device 102. As described herein, user input 202 may include information that identifies and characterizes the testamentary instrument of user 101, and user 101 may provide user input 202 in response to the generation and presentation of the digital interface by executed commitment engine 108. Input unit 118B may also route corresponding input data 204, which includes all or a portion of user input 202, to a transaction initiation module 206 of executed commitment engine 108.

In some instances, input data 204 may include, but is not limited to: (i) asset data 208 that identifies the one or more distributable assets specified within user 101's testamentary instrument; (ii) distribution data 210 that characterizes a specified distribution of these assets to one or more corresponding beneficiaries; and in some instances, (iii) condition data 212 that identifies and characterizes one or more conditions imposed on the distribution of these assets to the one or more corresponding beneficiaries. By way of example, asset data 208 may include a unique identifier of each of the distributable assets specifies within user 101's testamentary instrument, such as, but not limited to, a tokenized or actual account number associated with a financial services account held by user 101, a public cryptographic key associated with a cryptocurrency account held by user 101, or any of the unique identifiers of real estate physical property described herein.

Distribution data 210 may characterize the distribution each asset specified within the testamentary instrument and identifier within the asset data. By way of example, and for a corresponding one of the distributable assets, distribution data 210 may include a unique identifier of each beneficiaries, along with a specific or fractional portion of the corresponding distributable asset associated to each of the beneficiaries. Further, condition data 212 may also associate one or more of the distributable assets, and a specified allocation of each of the one or more distributable asset to a corresponding one of the beneficiary identifiers, with a condition imposed on the specified allocations Examples of the unique beneficiary identifiers include, but are not limited to, an identifier issued by a governmental entity, such as a driver's license, a social security number, or a passport number, a cryptographic key or token generated by management system 130 (e.g., and tied to corresponding login credentials, authentication credentials, and other unique digital identifiers within the authentication blocks of the distributed ledger), or another unique digital identifier associated with or identifying the beneficiaries. Further, and as described herein the imposed conditions may specify, among other things, an age of the beneficiary, a marital or parental status of that beneficiary, a residence of that beneficiary, or any of the conditions consistent with the asset or the distribution, and appropriate to the testamentary instrument.

In further instances, input data 204 may also include permissioning data 214 that identifies, and characterizes, one or more authorities or entities permitted by user 101 to access all or a portion of the asset, distribution, or condition data described herein (e.g., as maintained locally by management system 130 or immutably recorded onto the cryptographically secure distributed ledger by one or more of node systems 150), or to request a performance of operations involving portions of the asset, distribution, or condition data described herein (e.g., an initiation of one or more exchanges of data facilitating the allocation of the one or more of the asserts to corresponding ones of the beneficiaries upon a detected, and verified, occurrence of a triggering event, such as a death of user 101). For example, the one or more authorities or entities may include an attorney that prepared the testamentary instrument, or an individual designated as an executor of the testamentary instrument by user 101. Further, permissioning data 214 may include a unique digital identifier associated with each of the attorney or executor (as described herein), a corresponding alphanumeric login credential (e.g., should the attorney or investigator have a relationship with management system 130), or any of the government-issued identifiers described herein.

In other instances, permissioning data 214 may also identify one or more additional users of management system 130 capable of accessing limited portions of the asset, distribution, or condition data (e.g., as locally maintained by management system 130) or commitment values representative of the asset, distribution, or condition data (e.g., as immutably recorded within commitment blocks 158 of the distributed ledger). The additional user may, for example, include one or more of the beneficiaries, such as the spouse or child of user 101, the additional information may include a corresponding one of the beneficiary identifiers described herein, along with access data characterizing the access permission granted by user 101. The disclosed embodiments are, however, not limited to these examples of additional users, and in other instances, permissioning data 214 may identify one or more additional or alternate users, such as those that lack relationships with management system 130, that are permitted by user 101 to access certain selected portions of the asset, distribution, or condition data and/or the representative commitment values.

Further, and as illustrated in FIG. 2A, transaction initiation module 206 may also receive, as an input, document data 216 that identifies a physical copy of the testamentary instrument executed by user 101. Examples of document data 216 include, but are not limited to, image data characterizing one or more pages of the testamentary instrument (e.g., as captured by a digital camera included within client device 102, etc.) of a PDF copy of the testamentary instrument (e.g., as maintained within a tangible, non-transitory memory, etc.). In some instances, the receipt of document data 216 by transaction initiation module 206 may provide additional documentary proof that the testamentary instrument is properly executed and/or notarized in accordance with prevailing legal standards.

Transaction initiation module 206 may perform operations that store input data 204 (e.g., including asset data 208, distribution data 210, condition data 212, and/or permissioning data 214) and document data 216 within one or more tangible, non-transitory memories, e.g., within a portion of data repository 132. Further, and as described herein, transaction initiation module 206 may perform further operations that process asset data 208, distribution data 210, and condition data 212 to generate testamentary data 218, which includes elements of transaction data 220 that characterize the distribution of the assets held by user 101 and identified within user 101's testamentary instrument (e.g., as identified within asset data 208).

In one example, each element of transaction data 220 includes structured information that characterizes the distribution of a corresponding one of the assets identified within asset data 208 to one or more of the beneficiaries identified within distribution data 210. For instance, and for a particular asset, a corresponding element of transaction data 220 may include, but is not limited: (i) the unique identifier of that particular asset; (ii) a beneficiary array that includes the unique identifiers of each of the beneficiaries of the distribution of the particular asset; and (iii) an distribution array that includes the portions of that particular asset allocated to corresponding ones of the beneficiaries, e.g., and linked to corresponding ones of the beneficiary identifies maintained within the beneficiary array.

In some instances, the allocated portion of that particular asset may correspond to a fractional distribution of the particular asset, such as a specified percentage of funds maintained within a financial services account held by user 101, and the fractional distribution of the particular asset allocated to each of the beneficiaries must sum to unity (e.g., to maintain consistency). In other instances, the allocated portion of that particular asset may correspond to a unit distribution of the particular asset, e.g., a specified amount of funds from the financial services account held by user 101, and the unit distribution allocated to each of the beneficiaries must be equivalent to a quantity of available units (e.g., to maintain consistency). The disclosed embodiments are, however, not limited to allocated portion that include fractional distributions, or that include unit distributions, and in other instances, the allocated portions of one or more of the assets may include any of combination of fractional and unit distributions that is consistent with an available amount or quantity of the one or more assets.

By way of example, the testamentary instrument of user 101 may identify an investment account held by user 101, and may specify an asset allocation that distributes sixty-five percent of the funds remaining within the investment account to a spouse of user 101, and thirty-five percent of the remaining funds to a child of user 101, without imposing any condition on the distributions. In some instances, asset data 208 may include a unique identifier of the investment account, e.g., an actual or tokenized account number, and distribution data 210 may include, for the investment account, the unique identifiers for each of the beneficiaries (e.g., the government-issued identifiers of the spouse and child, such as, but not limited to, a driver's license number, social security number, etc.) and the fractional portions of the final account balance allocated to each of the beneficiaries (e.g., sixty-five percent for the spouse and thirty-five percent for the child). Further, as user 101 imposed no conditions on the disbursement to the spouse or child, condition data 212 may include no data for the investment account, e.g., an empty set.

In some instances, and using any of the processes described herein, transaction initiation module 206 may generate an element of transaction data 220 that characterizes the distribution of the funds remaining within user 101's investment account to the spouse and child of user 101. For example, the generated element of transaction data 220 may include the unique identifier of the investment account (e.g., the actual or tokenized account number), a beneficiary array that includes the governmental identifiers associated with the spouse and the child (e.g., the driver's license number, social security number, password number, etc.), and a distribution array that includes the fraction distributions specified for the spouse and the child (e.g., 0.65 and 0.35, respectively). Transaction initiation module 206 may also perform any of the exemplary processes described herein to generate an additional element of transaction data 220 that characterizes the distribution of each additional, or alternate, asset within identified within asset data 208 to corresponding beneficiaries identified within distribution data 210 subject to distribution conditions specified within condition data 212.

As illustrated in FIG. 2A, transaction initiation module 206 may also append permissioning data 214 to the generated elements of transaction data 220, e.g., within testamentary data 218. As described herein, permissioning data 214 may identify and characterize one or more individuals, authorities, or entities permitted by user 101 to access information characterizing the distribution of assets held by user 101 and identified within user 101's testamentary instrument (e.g., as maintained by management system 130 or immutably recorded onto the cryptographically secure distributed ledger by one or more of node systems 150), or to request a performance of operations that facilitate the distribution of these assets to corresponding beneficiaries (e.g., in response to a detected, and verified, occurrence of a triggering event, such as a death of user 101).

Transaction initiation module 206 may also generate document hash 222 based on an application of one or more hash functions to document data 216 (e.g., that includes a digital representation of the user 101's testamentary instrument), and perform operations that append document hash 222 to the generated elements of transaction data 220, e.g., within testamentary data 218. Examples of these hash functions include, but are not limited to, one or more functions consistent with the secured hash algorithm (SHA) standards, such as a SHA-3 algorithm. In some instances, transaction initiation module 206 may perform operations that store transaction data 220, and the appended permissioning data 214 and document hash 222, within a corresponding portion of a tangible, non-transitory memory, and may provide testamentary data 218 as an input to a commitment generation module 224 of executed commitment engine 108.

As illustrated in FIG. 2A, commitment generation module 224 may receive testamentary data 218, and may perform any of the exemplary process described herein to compute values of a commitment representing corresponding ones of the asset identifiers, the beneficiary identifiers, and the allocated asset portions specified within each of the elements of transaction data 220. By way of example, each of the computed commitment values may correspond to a value of homomorphic Pedersen commitment, and commitment generation module 224 may compute the Pedersen commitment value representative of each of the asset identifiers, the beneficiary identifiers, and the allocated asset portions (e.g., as specified within each of the elements of transaction data 220) using any of the exemplary processes described herein.

By way of example, a first element of transaction data 220 may characterize a distribution of funds remaining within user 101's investment account to a spouse and child of user 101, and as described herein, the first element of transaction data 220 may include the unique identifier of the investment account, the beneficiary array that includes the governmental identifiers associated with the spouse and the child, and an allocation array that included the fraction distributions specified for the spouse and the child (e.g., 0.65 and 0.35, respectively). In some instances, and as described herein, commitment generation module 224 may perform any of the exemplary processes described herein to a compute a commitment value representative of each of: (i) the unique investment-account identifiers, e.g., the actual or tokenized account number; (ii) the beneficiary identifier of the spouse, e.g., the spouse's government-issued identifier; (iii) the beneficiary identifier of the child, e.g., the child's government-issued identifier; (iv) the fractional distribution specified for the spouse, e.g., 0.65; and (v) the fractional distribution specified for the child, e.g., 0.35.

In some instances, to compute the commitment values representative of the first element of transaction data 220, commitment generation module 224 may perform operations that execute a random number generation engine, e.g., random number generator 226, and may request, and obtain, random numbers 228 generated by random number generator 226. By way of example, random numbers 228 may include a plurality of random numbers, each of which support the generation of the corresponding commitment value representing each of the unique investment-account identifier, the beneficiary identifier of the spouse, the beneficiary identifier of the child, the fractional distribution specified for the spouse, the fractional distribution specified for the child, as specified within the first element of transaction data 220.

As illustrated in FIG. 2A, commitment generation module 224 may receive random numbers 228 from random number generator 226, and may perform operations that access local commitment data store 114 (e.g., as maintained within application data 112 of data repository 110) and obtain one or more elements of supporting data 230. In some instances, the one or more elements of supporting data 230 may facilitate the calculation of the Pedersen commitment values, and as described herein, may include, but are not limited to, the values establishing each of the generators of the elliptic curve associated with the Pedersen commitment values and parameters of the discrete logarithmic scheme that associates the elliptic-curve generators.

Based on portions of random numbers 228 and on portions of supporting data 230, commitment generation module 224 may perform any of the exemplary processes described herein to generate a commitment values representative of the unique investment-account identifier, the beneficiary identifier of the spouse, the beneficiary identifier of the child, the fractional distribution specified for the spouse, the fractional distribution specified for the child, as specified within the first element of transaction data 220. In some instances, commitment generation module 224 may perform operations that package the generated commitment values (e.g., the commitment value representative of the investment-account identifier, an array of commitment values representative of the beneficiary identifiers of the spouse and child, and an array of commitment values representative of the fractional distributions specified for the spouse and child) into a structured element of commitment data 232.

Further, commitment generation module 224 may also perform any of the exemplary processes described herein to generate sets of additional commitment values representative of the asset identifiers, the beneficiary identifiers, and the allocated asset portions (and in some instances, the imposed distribution conditions) specified within corresponding ones of the additional or alternate elements of transaction data 220. In some instances, commitment generation module 224 may also package each generated set of additional commitment values (e.g., the commitment value representative of asset identifier, an array of commitment values representative of the beneficiary identifiers, an array of commitment values representative of the fractional or unit distributions specified for beneficiaries, and in some instances, an array of commitment values representative of the imposed conditions) into a corresponding one of the structured elements of commitment data 232. In additional examples, although not illustrated in FIG. 2A, commitment generation module 224 may also perform any of the exemplary processes described herein to compute a further commitment value representative of all, or a portion of permissioning data 214, e.g., as included within testamentary data 218, and that package this further commitment value into a corresponding portion of commitment data 232.

As illustrated in FIG. 2A, commitment generation module 224 may generate output data 234 that includes commitment data 232 and, in some instances, random number 228, and may provide output data 234 as an input to a digital signature module 236 of executed commitment engine 108, which may also access testamentary data 218, e.g., as maintained locally within data repository 110. In some instances, digital signature module 236 may perform operations that access local cryptographic data store 116 (e.g., as maintained within data repository 110) and obtained a private cryptographic key 238 associated with user 101. As described herein, private cryptographic key 238 may be generated, and provisioned to client device 102, by management system 130 based on an application of a hash function to a concatenation of the login and authentication credentials of user 101, either alone or further concatenated with a random number, during an initial registration of client device 102 with management system 130.

In some instances, and based on private cryptographic key 238, digital signature module 236 may apply a digital signature 240A to all or a portion of testamentary data 218, and may output digitally signed testamentary data 242 that includes testamentary data 218 and applied digital signature 240A. Digital signature module 236 may also apply a digital signature 240B to all or a portion of commitment data 232, and may output digitally signed commitment data 244 that includes commitment data 232 and applied digital signature 240B. Further, as using any of the exemplary processes described herein, digital signature module 236 may apply a digital signature 240C to all or a portion of random numbers 228, and may output digitally signed random numbers 246 that includes random numbers 228 and applied digital signature 240C.

As illustrated in FIG. 2A, digital signature module 236 may provide digitally signed testamentary data 242, digitally signed commitment data 244, and digitally signed random numbers 246 as an input to a recordation module 248 of executed commitment engine 108, which perform operations that package digitally signed testamentary data 242, digitally signed commitment data 244, and digitally signed random numbers 246 into corresponding portions of request data 250, along with one or more unique digital identifiers of user 101 or client device 102. By way of example, and as described herein, the one or more unique digital identifiers may include, but are not limited to an alphanumeric login credential assigned to user 101 by management system 130 (e.g., user identifier 249A, which recordation module 248 may obtain from application data 112) or a network address of client device 102, such as an IP address or a MAC address assigned to client device 102 (e.g., device identifier 249B, which recordation module 248 may obtain from device data 111).

Recordation module 248 may provide request data 250 as an input to a routing module 252 of client device 102. Further, routing module 252 may obtain, from one or more tangible, non-transitory memories, a network address assigned to management system 130, such as an IP address or a MAC address, and may perform operations that transmit request data 250 across network 120 to management system 130, e.g., across a secure, programmatic interface.

In some instances, management system 130 may process received request data 250 to verify an integrity of the digitally signed portions of request data 250 and further, an accuracy of the digitally signed commitment values. In response to the verified integrity and accuracy, management system 130 may perform any of the exemplary processes described herein to maintain confidential data identifying and characterizing the testamentary instrument of user 101 within one or more secure, locally accessible portions of a tangible, non-transitory memory (e.g., within managed exchange data 142 of data repository 132), to apply an additional digital signature to the digitally signed commitment values (e.g., to "countersign" user 101's digital signature of commitment data 232), and to broadcast the countersigned commitment data to one or more of node systems 150, which may verify a consistency of the countersigned commitment values and incorporate the countersigned commitment data into one or more time-stamped ledger blocks of a distributed ledger.

Figure 2B:
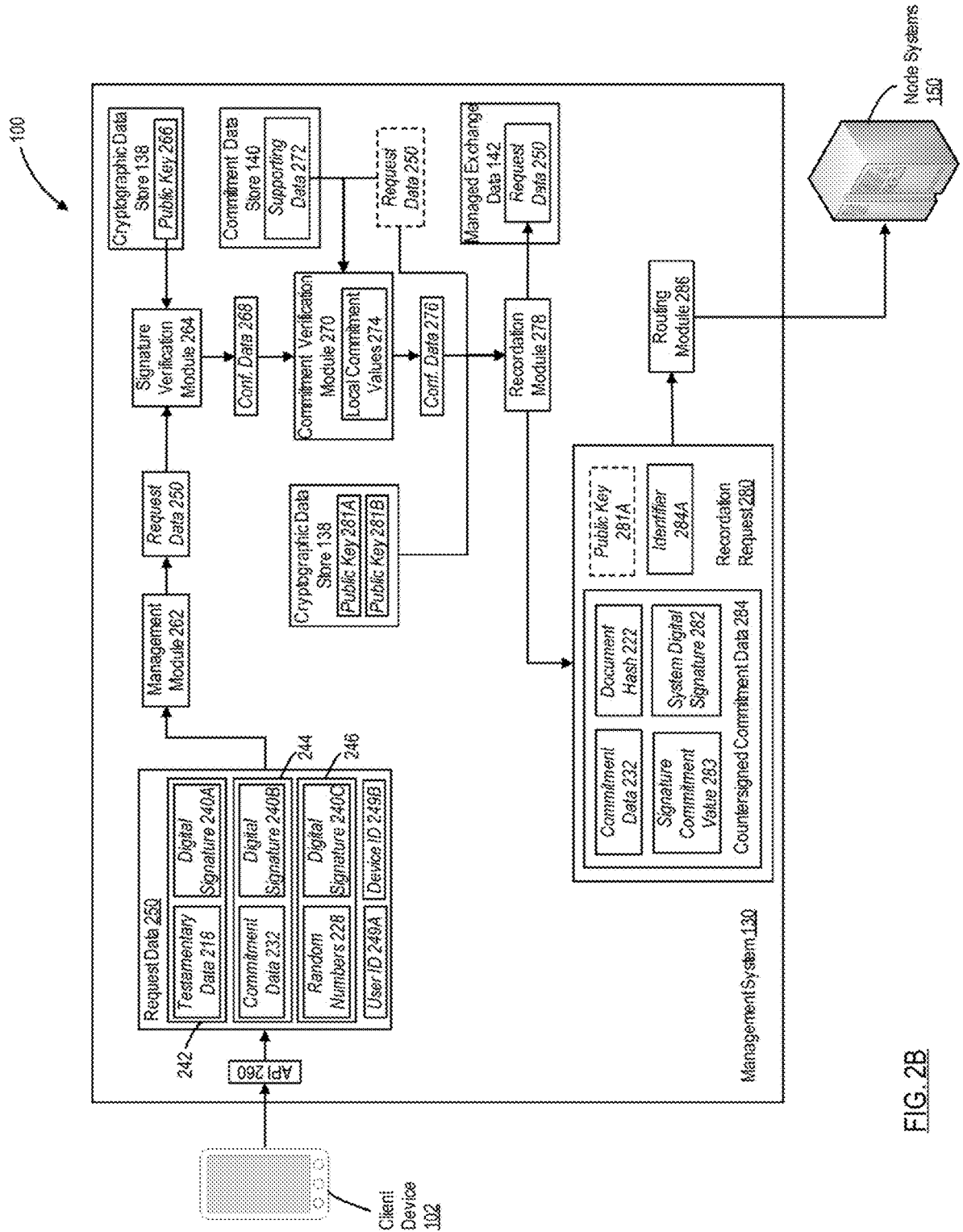

Referring to FIG. 2B, a secure programmatic interface of management system 130, e.g., application programming interface (API) 260, may receive and route request data 250 to a management module 262 executed by management system 130. API 260 may be associated with or established by management module 262, and may facilitate secure, module-to-module communications across network 120 between management module 262 and routing module 252 of client device 102. As described herein, request data 250 may include digitally signed testamentary data 242, digitally signed commitment data 244, and digitally signed random numbers 246, and management module 262 may perform operations that store request data 250 at a temporary location within one or more tangible, non-transitory memories, e.g., at a temporary location within data repository 132. Further, management module 262 may provide request data 250 as an input to a signature verification module 264 of management system 130.

In some instances, signature verification module 264 may perform operations that extract user identifier 249A, which uniquely identifies user 101 (e.g., the alphanumeric login credential, etc.) and additionally, or alternatively, device identifier 249B, which uniquely identifies client device 102 (e.g., the assigned IP or MAC address, etc.). Signature verification module 264 may also access cryptographic data store 138 (e.g., as maintained within data repository 132), and extract a public cryptographic key 266 associated with user identifier 249A and/or device identifier 249B. As described herein, public cryptographic key 266 may be generated by management system 130 (e.g., in conjunction with the private cryptographic key described herein) and provisioned to client device 102 during the initial registration processes described herein. In other instances (not illustrated in FIGS. 2A and 2B), client device 102 may perform operations that package public cryptographic key 266 into a corresponding portion of request data 250, and signature verification module 264 may extract public cryptographic key 266 from the corresponding portion of request data 250.

Based on public cryptographic key 266, signature verification module 264 may perform operations that verify digital signature 240A (e.g., as applied to testamentary data 218), digital signature 240B (e.g., as applied to commitment data 232), and digital signature 240C (e.g., as applied to random numbers 228). In some instances, the verification of the applied digital signatures within request data 250 may enable management system 130 to verify an identity of user 101 and additionally, or alternatively, client device 102, and further, to verify that client device 102 represents the source of generated and transmitted request data 250.

In one example, if signature verification module 264 were unable to verify one or more of applied digital signatures 240A, 240B, and 240C, signature verification module 264 may determine that an unauthorized third party intercepted or tampered with request data 250 during transmission to management system 130, or that an unauthorized user or device generated all or a portion of request data 250. Responsive to this determination (not illustrated in FIG. 2B), management system 130 may discard request data 250, and may generate and transmit an error message indicative of the failed verification across network 120 to client device 102, e.g., via a secure, programmatic interface, and client device 102 may perform any of the exemplary processes described herein to generate and present interface elements representative of the error message on a corresponding digital interface, e.g., as generated by executed commitment engine 108.

Alternatively, if signature verification module 264 were to verify successfully each of applied digital signatures 240A, 240B, and 240C, signature verification module 264 may generate confirmation data 268 indicative of the verified digital signatures, and provide confirmation data 268 to a commitment verification module 270. In some instances, commitment verification module 270 may receive confirmation data 268, and perform operations that access request data 250, e.g., as maintained within the temporary portion of data repository 132, and extract testamentary data 218, commitment data 232, and random numbers 228 from corresponding portions of digitally signed testamentary data 242, digitally signed commitment data 244, and digitally signed random numbers 246. Further, commitment verification module 270 may also perform any of the exemplary processes described herein to compute local values of commitments that represent corresponding elements of testamentary data 218, and to determine whether the locally computed commitment values are consistent with the commitment values included within commitment data 232, e.g., as generated and digitally signed by client device 102.

By way of example, and as described herein, testamentary data 218 may include, among other things, structured transaction data 220 that characterizes the distribution of a corresponding one of the assets identified within user 101's testamentary instrument to corresponding beneficiaries, and permissioning data 214 that identifies and characterizes one or more individuals, authorities, or entities permitted by user 101 to access all or a portion of the asset, distribution, or condition data described herein, or to request a performance of operations involving portions of the asset, distribution, or condition data described herein. For instance, and for a particular one of the assets, the corresponding elements of transaction data 220 may include, but is not limited: (i) the unique identifier of that particular asset; (ii) a beneficiary array that includes the unique identifiers of each of the beneficiaries of the distribution of the particular asset; and (iii) an distribution array that includes the portions of that particular asset allocated to corresponding ones of the beneficiaries, e.g., and linked to corresponding ones of the beneficiary identifies maintained within the beneficiary array.

Referring back to FIG. 2B, commitment verification module 270 may access commitment data store 140 (e.g., as maintained within data repository 132), and extract one or more elements of supporting data 272 that support the calculation of the local values of the Pedersen commitments. For example, the one or more elements of supporting data 230 may include, but are not limited to, the values establishing each of the generators of the elliptic curve associated with the Pedersen commitment values and parameters of the discrete logarithmic scheme that associates the elliptic-curve generators.

Based on portions of random numbers 228, and on portion of supporting data 272, commitment verification module 270 may perform any of the exemplary processes described herein to compute local commitment values 274 representative of each of the elements of transaction data 220 and in some instances, representative of permissioning data 214. Commitment verification module 270 may perform additional operations that establish a consistency between each of local commitment values 274 and a corresponding commitment value maintained within commitment data 232.

If, for example, commitment verification module 270 were to detect an inconsistency between one or more of local commitment values 274 and corresponding commitment values within commitment data 232, management system 130 may decline to perform additional operations that immutable record portions of commitment data 232 within a corresponding ledger block of a distributed ledger, such as the public or permissioned distributed ledger described herein. In some instances (not illustrated in FIG. 2B), management system 130 may perform operations that delete request data 250 from temporary portion of data repository 132, and may generate and transmit an error message indicative of the detected inconsistency across network 120 to client device 102, e.g., via a secure, programmatic interface, and client device 102 may perform any of the exemplary processes described herein to generate and present interface elements representative of the error message on a corresponding digital interface, e.g., as generated by executed commitment engine 108.

Alternatively, if commitment verification module 270 were to establish a consistency between each of local commitment values 274 and corresponding commitment values within commitment data 232, commitment verification module 270 may generate additional confirmation data 276 indicative of the established consistency and provide confirmation data 276 to a recordation module 278. In some instances, and based on the established consistency (e.g., as indicated by additional confirmation data 276), recordation module 278 may perform operations that obtain request data 250 from the temporary location within the one or more tangible, non-transitory memories (e.g., the temporal location within data repository 132), and store request data 250 within a secure portion of data repository 132, e.g., within managed exchange data 142.

As described herein, request data 250 may include, but is not limited to, digitally signed testamentary data 242, digitally signed commitment data 244, and digitally signed random numbers 246, along with one or more unique digital identifiers of user 101 or client device 102, such as user identifier 249A or device identifier 249B. Further, in some instances, recordation module 278 may also generate and maintain, within managed exchange data, temporal data that characterizes a time or date on which recordation module 278 recorded request data within the secure portion of managed exchange data 142. In some examples, described below, recordation module 278 may also perform operations that package all, or a portion of digitally signed commitment data 244 within a request, e.g., recordation request 280, to immutably record the computed commitment values representative of testamentary data 218 (e.g., as such, the asset distributions specified within user 101's testamentary instrument) within one or more elements of a cryptographically secure, distributed ledger.

By way of example, recordation module 278 may access cryptographic data store 138, and obtain a public cryptographic key 281A and a pubic cryptographic key 281A associated with management system 130. Further, in some examples, recordation module 278 may perform additional operations that extract document hash 222 from digitally signed testamentary data 242 (e.g., which represents the digital copy of user 101's testamentary instrument) and append document hash 222 to digitally signed commitment data 244.

In some instances, recordation module 278 may perform any of the exemplary processes described herein to countersign digitally signed commitment data 244 by applying an additional, "system" digital signature 282 to commitment data 232, document hash 222, and digital signature 240A, e.g., based on private cryptographic key 281B. Recordation module 278 may generate countersigned commitment data 284 that includes commitment data 232, document hash 222, digital signature 240A, and system digital signature 282, and may perform operations that package countersigned commitment data 284 into a corresponding portion of recordation request 280.

In other examples, to further maintain a confidentiality of an identity of user 101 or client device 102 within the publicly accessible distributed ledgers described herein, recordation module 278 may perform any of the exemplary processes described herein to compute an additional commitment value representative of digital signature 240A, e.g., signature commitment value 283. Further, and using private cryptographic key 281B, recordation module 278 may generate system digital signature 282 based on commitment data 232, document hash 222, and signature commitment value 283. Recordation module 278 may also perform operations that package commitment data 232, document hash 222, signature commitment value 283, and system digital signature 282 into corresponding portions of countersigned commitment data 284, which recordation module 278 may include with recordation request 280. In some instances, recordation module 278 may also package public cryptographic key 281A, which identifies management system 130 (and additionally, or alternatively, the financial institution that operates management system 130), into a corresponding portion of recordation request 280.

Further, as illustrated in FIG. 2B, recordation module 278 may also package a unique contract identifier 284A of the distributed smart contract within the block-chain ledger (e.g., a network address associated with smart contract ledger blocks 160 of FIG. 1) within a portion of recordation request 280. In some instances, recordation module 278 may provide recordation request 280 as an input to a routing module 286 of management system 130, which may obtain a unique network address of each node systems 150, such as an IP address of node system 152, and perform operations that cause management system 130 to broadcast recordation request 280 across network 120 to each of node systems 150, including node system 152, e.g., using any appropriate communications protocol.

In some examples, as described herein, recordation request 280 may include system digital signature 282, which management system 130 computes on the basis of private cryptographic key 281B of management system 130, and public cryptographic key 281A, which facilitates a verification of the digitally signed data by one or more of node systems 150. When immutably recorded within one or more elements of a distributed ledger, however, an individual accessing the distributed ledger, e.g., through a corresponding network-connected device or system, may be able to determine, or infer, a relationship between user 101 and the financial institution that operates management system 130, e.g., based on the digital signature or the public cryptographic key.

In other instances, and to maintain a confidentiality of both the distribution specified within the testamentary instrument of user 101 (e.g., via the commitment values described herein) and the relationship between user 101 and the corresponding financial institution, recordation module 278 may perform operations that compute system digital signature 282 based not on asymmetric cryptographic keys, but instead based on one or more digital ring signature algorithms. For example, the application of a ring digital signature to portions of commitment data 232, document hash 222, and signature commitment value 283 (and additionally, or alternatively, to digital signature 240B) may indicate an endorsement by a group of network-connected computing systems operating within environment 100, which include, but are not limited to, management system 130.

Figure 2C:
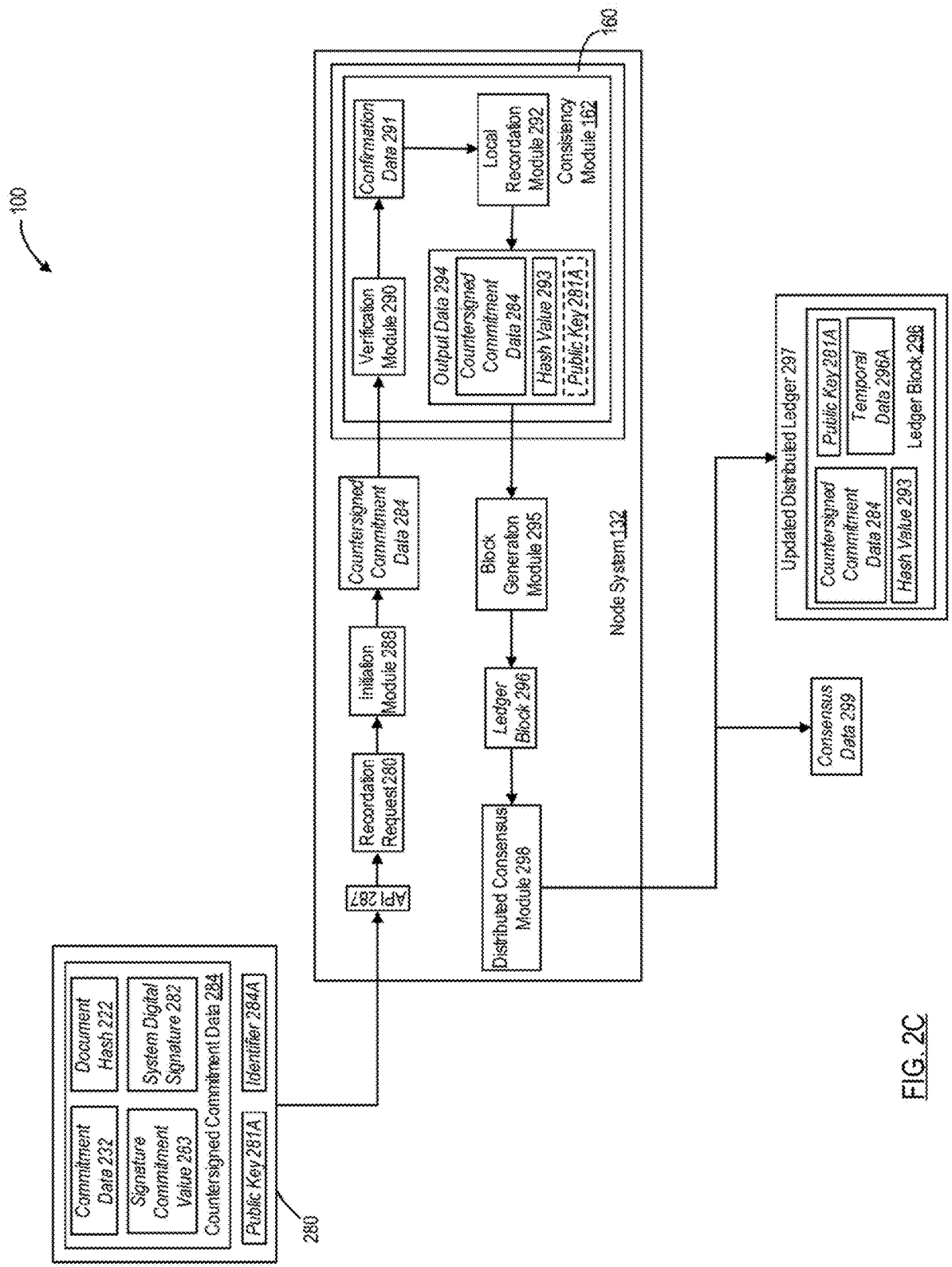

Referring to FIG. 2C, node system 152 (and each additional or alternate one of node systems 150) may receive recordation request 280 through a corresponding programmatic interface, such as application programming interface (API) 287. In some instances, API 287 may route recordation request 280 to an initiation module 288, which may process recordation request 280 to detect a presence of contract identifier 284A, e.g., that uniquely identifies the distributed smart contract within the distributed ledger. In some aspects, and in response to the detection of contract identifier 284A, initiation module 288 may perform operations that invoke the distributed smart contract and thus, the execution of the code elements that establish the distributed smart contract, e.g., as maintained within consistency module 162 of smart contract ledger blocks 160.

In some instances, one or more processors of node system 152 may access the distributed ledger (e.g., as maintained within ledger data 156 of data repository 132) and execute the code elements maintained within consistency module 162. In other instances, and consistent with the disclosed embodiments, node system 152 may execute an instance of a distributed virtual machine, which accesses the distributed ledger and executes the code elements maintained within consistency module 162 (e.g., based on output data generated by initiation module 288). Upon invocation of the distributed smart contract, initiation module 288 may extract countersigned commitment data 284 from recordation request 280 and provide countersigned commitment data 284 as an input to consistency module 162, which includes the executable code elements that establish the distributed smart contract.

As described herein, countersigned commitment data 284 may include, but is not limited to, commitment data 232, document hash 222, signature commitment value 283 representative of digital signature 240B, and system digital signature 282. Further, and in some examples, a verification module 290 of consistency module 162 may receive countersigned commitment data 284, and may perform operations that extract public cryptographic key 281A from supporting data 164, and that verify system digital signature 282 based on public cryptographic key 281A.

Further, and by way of example, recordation request 280 may include public cryptographic key 281A, and initiation module 288 may perform operations that package countersigned commitment data 284 and public cryptographic key 281A as payload data, and that provision the payload data, which includes countersigned commitment data 284 and public cryptographic key 281, as an input to verification module 290. In other examples, system digital signature 282 may correspond to a digital ring signature, and verification module 290 may implement any appropriate digital ring-signature verification scheme to verify the generation of the digital ring signature by cryptographic keys maintained by the endorsing group of network-connected computing systems, as described herein.

In one instance, if verification module 290 were unable to verify system digital signature 282, the distributed smart contract may decline to immutably record countersigned commitment data 284 within one or more additional ledger blocks of the cryptographically secure distributed ledger described herein. In response to this determination (not illustrated in FIG. 2C), consistency module 162 may output data indicative of the unsuccessful verification, which node system 152 may relay back to client device 102, e.g., directly across network 120 or through a programmatic interface established with management system 130.

Alternatively, if verification module 290 were to successfully verify system digital signature 282, executed consistency module 162 may further parse commitment data 232 (e.g., as maintained within countersigned commitment data 284) to obtain an array of commitment values representative of fractional or unit distributions of each asset specified within the testamentary instrument of user 101. Based on information maintained within supporting data 164, verification module 290 may perform operations that verify an internal consistency of the obtained array of commitment values. By way of example, verification module 290 may verify the internal consistency of the obtained array of commitment values based on a determination that: (i) a sum of each of the commitment values representative of the fractional distributions are equivalent to the commitment value representative of unity; or (ii) a sum of each of the commitment values representative of the unit distributions are equivalent to a commitment value representative of the total amount of available units. In some instances, and as described herein, the verification of the internal consistency by verification module 290 may leverage one or more properties of the commitment values, which include, but are not limited to, an application of a zero-knowledge equality proof to values of homomorphic Pedersen commitments representative of the fractional or unit distribution.

In one instance, if verification module 290 were unable to verify the internal consistency of the obtained array of commitment values, the distributed smart contract may decline to immutably record countersigned commitment data 284 within one or more additional ledger blocks of the cryptographically secure distributed ledger described herein. In response to this determination (not illustrated in FIG. 2C), consistency module 162 may output data indicative of the unsuccessful verification, which node system 152 may relay back to client device 102, e.g., directly across network 120 or through a programmatic interface established with management system 130.

Alternatively, if verification module 290 were to verify the internal consistency of the obtained array of commitment values, verification module 290 may output confirmation data 291 indicative of the successful verification of both the digital signature and the established internal consistency. In some instances, confirmation data 291 may include countersigned commitment data 284, along with additional or alternate data, such as, but not limited to, public cryptographic key 281A, and verification module 290 may provide confirmation data 291 as an input to a local recordation module 292, which may process portions of confirmation data 291 for submission to the distributed ledger.

For example, local recordation module 292 may process confirmation data 291 to extract countersigned commitment data 284 (and in some instances, to extract public cryptographic key 281A). Local recordation module 292 may also perform operations that generate a hash value 293 based on any application of any of the hash algorithms described herein to countersigned commitment data 284, either alone or in conjunction with public cryptographic key 281A. In some instances, local recordation module 292 may generate output data 294, which includes countersigned commitment data 284 and hash value 293 (and in some instances, public cryptographic key 281A), and provide output data 294 as an input to a block generation module 295 of node system 152. For example, block generation module 295 may perform operations that generate a new ledger block 296 that includes countersigned commitment data 284 and hash value 293, and in some instances, links countersigned commitment data 284 and hash value 293 to public cryptographic key 281A of management system 130. Further, as illustrated in FIG. 2C, new ledger block 296 may also include temporal data 296A characterizing a time or date at which block generation module 295 added countersigned commitment data 284 to new ledger block 296.

Node system 152 may perform additional operations that append new ledger block 296 to a prior version of the permissioned distributed ledger to generate a latest, longest version of the distributed ledger (e.g., an updated distributed ledger 297). For example, the additional operations may be established through a distributed consensus among the other node systems operating within environment 100, and may include, but are not limited to, the calculation of an appropriate proof-of-work or proof-of-stake by a distributed consensus module 298 prior to the other node systems. In certain aspects, node system 152 may broadcast evidence of the calculated proof-of-work or proof-of-stake to the other node systems across network 120 (e.g., as consensus data 299).

Node system 152 may also broadcast updated distributed ledger 297, which represents the latest, longest version of the distributed ledger, to the other node systems operating within environment 100 and additionally or alternatively, to each of the network-connected systems that participate in the blockchain network, such as management system 130.

Upon inclusion of new ledger block 296 within updated distributed ledger 297, commitment values representative of the assets, distributions, and imposed conditions specified within user 101's testamentary instrument may be immutable recorded within updated distributed ledger 297, while management system 130 maintains actual values and data characterizing these assets, distributions, and imposed conditions within a secure portion of a locally accessible data repository, such as within managed exchange data 142 of FIG. 1. In some exemplary embodiments, the maintenance of the representative commitment values within updated distributed ledger 297 may enable one or more individuals, entities, or organization to confirm user 101's commitment to the specified distributions of assets to corresponding beneficiaries, and a time or date associated with commission, while maintaining the privacy of user 101 and maintaining a confidentiality of the specified assets, the specific fractional or unit distributions, and the identities of the corresponding beneficiaries.

Further, although not illustrated in FIG. 2C, node system 152 may generate and transmit data (e.g., a recordation confirmation) confirming the successful recordation of countersigned commitment data 284 onto updated distributed ledger 297 across network 120 to management system 130, e.g., across a secure programmatic interface. For example, the recordation confirmation may include output data 294, which includes countersigned commitment data 284 and hash value 293 (and in some instances, public cryptographic key 281A) immutable recorded within new ledger block 296, and temporal data 296A, which characterizes a time or date at which block generation module 295 added output data 294 to new ledger block 296. In some instances, and consistent with the disclosed embodiments, management system 130 may perform operations that transmit all, or a portion, of the recordation confirmation across network 120 to client device 102.

Client device 102 may receive the recordation confirmation through a corresponding programmatic interface, such as an application programming interface (API) associated with executed commitment engine 108, and executed commitment engine 108 may perform operations that store the recordation confirmation within a tangible, non-transitory memory, such as within a portion of application data 112. In some instances, the recordation confirmation may correspond to an electronic receipt confirming the secure and confidential maintenance of testamentary data 218 within a tangible, non-transitory memory of management system 130, and the immutable recordation of corresponding countersigned commitment data 284 within new ledger block 296 of updated distributed ledger 297.

In other examples, and consistent with the disclosed exemplary embodiments, user 101 may, over time, amend the testamentary instrument to modify the specified distribution of certain assets, or to augment the specified distributions to include additional, or alternate, distributions of corresponding assets, or to modify an identity of an executor or other executing authority. For example, the amendments to the testamentary instrument may reflect a change in marital status, such as a divorce or a subsequent remarriage, a change in a family structure, such as an adoption of child, or an acquisition of additional assets requiring distribution to corresponding beneficiaries.

In some instances, user 101 may provide any of the exemplary input described herein, e.g., to client device 102 via input unit 118B, that identifies and characterizes these amendments to the testamentary instrument, e.g., in the form of a codicil or rider to the existing testamentary instrument, an execution of an additional testamentary instrument that explicitly replaces the prior testamentary instrument, etc. Further, executed commitment engine 108 may perform any of the exemplary processes described herein to generate additional elements of digitally signed request data that reflect the assets, distribution, and/or distribution conditions imposed by the amendments to the testamentary instruments, and that include commitment values representative of the specified assets, the specified distributions, or the imposed conditions (along with the corresponding random numbers leveraged to generate the commitment values), and to transmit these additional elements of digitally signed request data across network 120 to management system 130, e.g., across the secure programmatic interface described herein.

Management system 130 may receive the additional elements of digitally signed request data from client device 102, and may perform any of the exemplary processes described herein to verify an identity of user 101 (or client device 102), and an integrity of the additional elements of request data (e.g., based a verification of one or more digital signature included within the additional elements of request data, such as digital signatures 240A, 240B, and 240C), and further, to confirm an accuracy of digitally signed commitment values included within these additional elements of digitally signed request data. In response to the verified identity of user 101 (or of client device 102), the verified integrity of the additional elements of digitally signed request data, and the accuracy of the digitally signed commitment data, management system 130 may perform any of the exemplary processes described herein to store the additional elements of digitally signed request data within a secure portion of locally accessible data repository, such as managed exchange data 142 of FIG. 1.

Further, and as described herein, management system 130 may perform additional operations that, in conjunction with one or more of node systems 150, countersign the digitally signed commitment values and immutably record the countersigned commitment values, which represent the amendments to the testamentary instrument, within an additional ledger block of a distributed ledger. In some instances, the additional ledger block may also immutably record temporal data associated with the newly recorded and digitally signed commitment data (e.g., that specifies a time of date on which block generation module 295 recorded the countersigned commitment values onto the additional ledger block). The recorded temporal data may, for example, establish an immutable temporal record of the amendments and modifications to the testamentary instrument of user 101, and can establish a current or effective version of the testamentary instrument in an event of a dispute.

In some examples, and consistent with the disclosed embodiments, management system 130 may also perform operations that establish, for user 101, a unique digital identifier that supports a successive or repetitive authentication of user 101's identity by management system 130, e.g., in response to submitted data characterizing each amendment or modification to the testamentary instrument. The unique digital identifier may include, but is not limited to, a digital token, a cryptogram, a cryptographic key, a random number, or other unique element of cryptographic data structure (e.g., data specifying a matrix barcode, such as a QR code). Further, management system 130 may generate the unique digital identifier for user 101 based on an application of one or more tokenization schemes, cryptographic key generation schemes, or other algorithms to locally maintained identifiers of user 101 or client device 102, such as, but not limited to, an alphanumeric login or authentication credential of user 101, a biometric credential of user 101, a government-issued identifier of user 101, or an IP or MAC address assigned to client device 102, as maintained within a corresponding portion of data repository 132, e.g., within user data 134.

Management system 130 may, for example, store the generated digital identifier within a portion of user data 134 and associate or link the stored digital identifier to one or more of the locally maintained identifiers of user 101 or client device 102 described herein. Further, management system 130 may perform operations that transmit the generated digital identifier to client device 102 across network 120 to client device 102, e.g., across a secure programmatic interface, for storage within a corresponding portion of data repository 110, e.g., within application data 112. In some instances, management system 130 may transmit the generated unique identifier to client device 102 concurrently with data confirming an initial recordation of commitment data representative of user 101's testamentary instrument within a distributed ledger data structure, such as the immutable recordation of corresponding countersigned commitment data 284 within new ledger block 296 of updated distributed ledger 297.

In some instances, and in response to an amendment or a modification to the testamentary instrument of user 101, executable commitment engine 108 may perform operations that transmit, to management system 130 across network 120, the unique digital identifier of user 101 (e.g., as extracted from application data 112) concurrently with additional elements of digitally signed request data that reflect the assets, distribution, and/or distribution conditions imposed by the amended or modified testamentary instrument, and that include commitment values representative of the specified assets, the specified distributions, or the imposed conditions (along with the corresponding random numbers leveraged to generate the commitment values). Upon receipt of the unique digital identifier, management system 130 may perform operations that confirm that the assignment of the unique digital identifier to client device 102, e.g., based on portions of user data 134 that link the unique digital identifier of user 101 within additional identifiers of user 101 and of client device 102, as described herein, and as such, authenticate user 101 and confirm an ability of client device 102 to access, modify, or augment portions of locally stored or immutable recorded testamentary or commitment data.

Further, and as described herein, management system 130 may also include permissioning data 214 that identifies, and characterizes, one or more individuals, entities, or authorities permitted by user 101 to access all or a portion of the asset, distribution, or condition data described herein (e.g., as maintained locally by management system 130 or immutably recorded onto the cryptographically secure distributed ledger by one or more of node systems 150), or to request a performance of operations involving portions of the asset, distribution, or condition data described herein (e.g., an initiation of one or more exchanges of data facilitating the allocation of the one or more of the asserts to corresponding ones of the beneficiaries upon a detected, and verified, occurrence of a triggering event, such as a death of user 101). For example, the one or more authorities or entities may include an attorney that prepared the testamentary instrument, or an individual designated as an executor of the testamentary instrument by user 101, and permissioning data 214 may a corresponding alphanumeric login credential (e.g., should the attorney or investigator have a relationship with management system 130), any of the government-issued identifiers described herein.

In addition to identifying the attorney, executor, or other executing authority (e.g., using any of the identifiers described herein), permissioning data 214 may also include information characterizing one or more access or operational permissions granted to the attorney, executor, or other executing authority. For example, these access or operational permissions may grant the executor a temporally unlimited ability to access elements of digitally signed testamentary data maintained locally by management system, or immutably recorded within the distributed ledger data, upon detection and verification of a corresponding triggering event, e.g., a death of user 101 (or a temporally limited ability to access the locally maintained or immutably recorded data prior to the detection or verification of the triggering event). In other examples, these access or operational permissions may grant the executor an ability to request an initiation of one or more exchanges of data consistent with user 101's testamentary instrument, including electronic transfers of funds in accordance with one or more of the asset distributions specified within the testamentary instrument, upon detection and verification of a corresponding triggering event, e.g., a death of user 101.

In some examples, and to confirm the grant of these access or operational permissions to the attorney, executor, or executing authority by user 101, management system 130 may perform operations that store the generated digital identifier of user 101 within a portion of the permissioning data 214. Furthermore, management system 130 may also perform operations that associate or link, within permissioning data 214, the generated digital identifier of user 101 to one or more of the user or device identifiers associated with corresponding ones of the attorney, executor, or executing authority, such as, but not limited to, an alphanumeric login credential, an alphanumeric password, a biometric credential, or a network address assigned to a corresponding device.

Additionally, or alternatively, management system 130 may also perform operations that generate an attorney-, executor-, or authority-specific digital identifier based on an application of one or more tokenization schemes, cryptographic key generation schemes, or other algorithms to corresponding ones of the user or device identifiers maintained within permissioning data 214, such as, but not limited to, an alphanumeric login credential, an alphanumeric password, a biometric credential, or a network address assigned to a corresponding device. Management system 130 may perform any of the exemplary processes described herein to store the newly generated attorney-, executor-, or authority-specific digital identifier within a corresponding portion of permissioning data 214, and to associate or link, within permissioning data 214, the generated attorney-, executor-, or authority-specific digital identifier to the user or device identifiers associated with corresponding ones of the attorney, executor, or executing authority.

Management system 130 may also provide the generated digital identifier (e.g., the digital identifier of user 101, or the attorney-, executor-, or authority-specific digital identifier) to a network-connected device or system associated the attorney, executor, or executing authority, such as client device 122 of FIG. 1, across network 120 through a secure, programmatic interface. In some instances, management system 130 may also transmit, across network 120 to client device 122 (and to any additional, or alternate, network-connected device or system of the attorney, executor, or executing authority), portions of the data (e.g., the recordation confirmation described herein) confirming the secure, confidential storage of the testamentary data within the locally accessible data repository of management system 130, and the immutable recordation of the countersigned commitment data within the cryptographically secure, distribution ledger. Client device 122 may perform any of the exemplary processes described herein to that store the generated digital identifier, and the recordation confirmation, within a corresponding portion of a tangible, non-transitory memory.

In other instances, management system 130 may perform any of the exemplary processes described herein to generate a digital identifier for one or more additional individuals or entities granted permission by user 101 to access and view portions of the digitally signed commitment data immutably recorded onto the distributed ledger, such as, but not limited to, one of the beneficiaries identified within testamentary data 218. For example, user 101 may grant the one or more beneficiaries permission to view the countersigned commitment data immutably recorded on the distributed ledger data structure, e.g., countersigned commitment data 284 recorded onto new ledger block 296, in response to a request generated and transmitted to management system 130 by a corresponding network-connected device or system.

As described herein, management system 130 may store the generated digital identifier (e.g., a beneficiary-specific identifier) within a corresponding portion of permissioning data 214, and may associate or link the generated, beneficiary-specific identifier to one or more corresponding user or device identifiers associated with the beneficiary. Management system 130 may also provide the generated, beneficiary-specific digital identifier to a network-connected device or system associated the beneficiary through a secure, programmatic interface.

In some examples, and as described herein, a network-connected device, such as client device 122, may perform operations that generate a request to access a portion of the countersigned commitment data immutably recorded within the distributed ledger (e.g., countersigned commitment data 284 recorded within new ledger block 296) and additionally, or alternatively, to access a portion of the securely maintained testamentary data (e.g., testamentary data 218 maintained within managed exchange data 142). Further, the network-connected device, e.g., client device 122, may also perform operations that generate a request to perform one or more operations consistent with the securely maintained portions of the testamentary data (e.g., an exchange of data facilitating a distribution of an asset in accordance with specified fractional or unit distributions).

In some exemplary embodiments, client device 122 may be operated by a corresponding user, such as user 121, designed as an executor of the testamentary instrument of user 101, such as user 101's will. In response to a detected occurrence of a triggering event associated with user 101's testamentary instrument, such as user 101's death, user 121 may provide input to client device 122, e.g., via a corresponding input unit, that triggers an execution of one or more locally maintained application programs, which generate and present a corresponding digital interface, e.g., on a corresponding display unit. Based on the presented digital interface, user 121 may provide additional input to client device 122 that specifies user 101, identifies the occurrence of the triggering event (e.g., user 101's death), and identifies one or more locally maintained digital copies of documents capable of verifying the occurrence of the triggering event (e.g., a digital copy of a death certificate, a digital copy of a probate order issued by a court or governmental entity of competent jurisdiction, etc.).

The one or more executed application programs may perform operations that package the user input into corresponding portions of a corresponding distribution request, along with the digital identifier of user 121 and portions of the data confirming the recordation of commitment data associated with user 101's testamentary instrument onto the distributed ledger (e.g., as generated and provisioned to client device by management system 130 using any of the processes described above). In some instances, and as described herein, the digital identifier of user 121 may include, but is not limited to, a digital token, a cryptogram, a random number, or a cryptographic key, and the confirmation data may include, but is not limited to, countersigned commitment data 284, hash value 293, in some instances, public cryptographic key 281A.

Further, in some instances, the one or more executed application programs may also package, into portions of the distribution request, a user identifier associated with user 121 (e.g., an alphanumeric login credential or password, a biometric credential, etc.) and a device identifier associated client device 122 (e.g., an assigned IP address or MAC address, etc.). The one or more executed application programs may also cause client device 122 to perform operations that transmit the generated distribution request, e.g., distribution request 302 or FIG. 3A, across network 120 to management system 130, e.g., using any appropriate communications protocol.

Figure 3A:
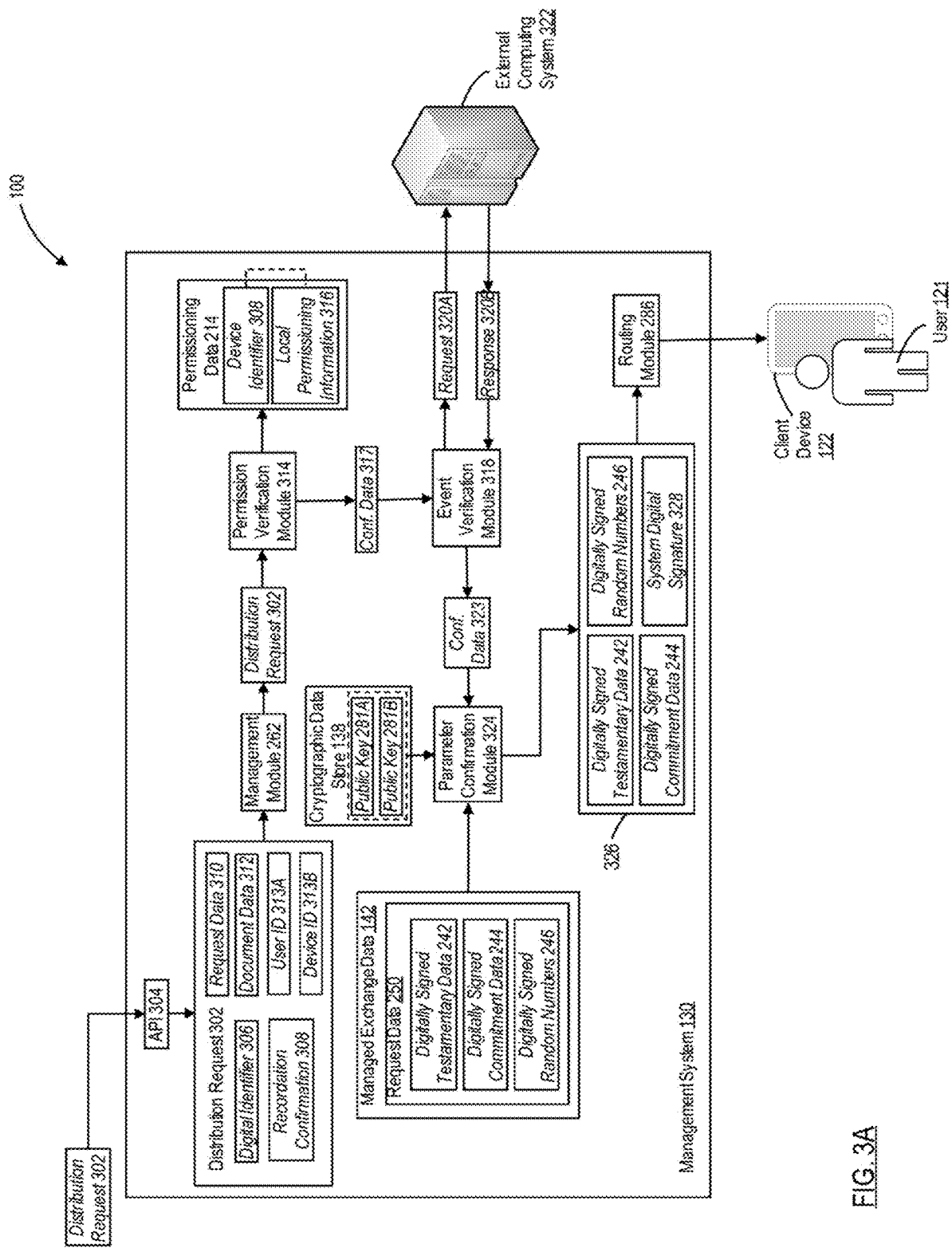

Referring to FIG. 3A, a secure programmatic interface of management system 130, e.g., application programming interface (API) 304, may receive and route distribution request 302 to management module 262. API 304 may be associated with or established by management module 262, and may facilitate secure, module-to-module communications across network 120 between management module 262 and the one or more application programs executed by client device 122. As described herein, distribution request 302 may include, but is not limited to: a digital identifier 306 of user 121; recordation confirmation 308 that confirms the recordation of commitment data associated with user 101's testamentary instrument onto the distributed ledger data structure; request data 310 that identifies and characterizes distribution request 302, e.g., a request for distribution of assets in accordance with the testamentary instrument of user 101; document data 312 identifying a document that verifies an occurrence of a triggering event associated with user 101's testamentary instrument; and a user identifier 313A and a device identifier 313B, as described herein.

In some instances, management module 262 may perform operations that store distribution request 302 at a temporary location within one or more tangible, non-transitory memories, e.g., at a temporary location within data repository 132. Further, management module 262 may provide distribution request 302 as an input to a permission verification module 314 of management system 130. Permission verification module 314 may perform operations that parse distribution request 302 to extract digital identifier 306 (and in some instances, user identifier 313A and/or device identifier 313B), and further, that access permissioning data 214 (e.g., as maintained within managed exchange data 142 as part of digitally signed testamentary data 242) and identify one or more data records that include or reference digital identifier 306 and in some instances, user identifier 313A and/or device identifier 3136.

As illustrated in FIG. 3A, permission verification module 314 may extract, from the one or more identified data records, local permissioning information 316 that identifies and characterizes one or more access or operational permission granted to user 121 by user 101. For example, the operational permission may correspond to an ability, granted by user 101, to request an initiation of one or more exchanges of data consistent with user 101's testamentary instrument, including electronic transfers of funds in accordance with one or more of the asset distributions specified within the testamentary instrument, upon detection and verification of a corresponding triggering event, e.g., a death of user 101. In some instances, permission verification module 314 may perform operations that compare request data 310 (e.g., as extracted from distribution request 302) again corresponding portions of local permissioning information to determine whether user 121 is permissioned to request the distribution of assets in accordance with the testamentary instrument of user 101.

If permission verification module 314 were to establish an inconsistency between request data 310 and the extracted portions of local permissioning information 316, permission verification module 314 may determine that user 121 lacks operational permission sufficient to request the distribution of assets in accordance with the testamentary instrument of user 101. Responsive to this determination (not illustrated in FIG. 3A), management system 130 may discard distribution request 302, and may generate and transmit an error message indicative of the established inconsistency across network 120 to client device 122, e.g., via a secure, programmatic interface, for presentation on a corresponding digital interface, e.g., as generated by the one or more executed application programs.

Alternatively, if permission verification module 314 were to determine that request data 310 is consistent with the extracted portions of local permissioning information 316 (e.g., that user 121 is permitted to request the distribution of assets in accordance with the testamentary instrument of user 101), permission verification module 314 may perform additional operations (not illustrated in FIG. 3A) to establish that recordation confirmation 308 is consistent with the countersigned commitment data representative of user 101's testamentary instrument and recorded immutably onto the distributed ledger data structures, e.g., countersigned commitment data 284 recorded onto new ledger block 296 of FIG. 2C. For example, permission verification module 314 may perform operations that generate and transmit a request for countersigned commitment data 284 to one or more of node systems 150, including node system 152, across a secure, programmatic interface.

As described herein, one or more of node systems 150, such as node system 152, may access and execute elements of code maintained within the distributed ledger structure (e.g., within smart contract ledger blocks 160 of FIG. 1, which collectively establish a distributed smart contract), and the executed code elements may cause the one or more node systems, such as node system 152, to parse the ledger blocks of the distributed ledger and extract countersigned commitment data 284 from a corresponding one of the ledger blocks, e.g., from new ledger block 296 described above. In some instances, node system 152 may perform operations that transmit countersigned commitment data 284 to management system 130, e.g., across a secure, programmatic interface, and permission verification module 314 may perform operations that compare received countersigned commitment data 284 against corresponding portions of recordation confirmation 308.

If permission verification module 314 were to establish an inconsistency between countersigned commitment data 284 and one or more of the portions of recordation confirmation 308, permission verification module 314 may further determine that user 121 lacks operational permission sufficient to request the distribution of assets in accordance with the testamentary instrument of user 101. Responsive to this determination (not illustrated in FIG. 3A), management system 130 may discard distribution request 302, and may generate and transmit an error message indicative of the established inconsistency across network 120 to client device 122, e.g., via a secure, programmatic interface.

Alternatively, if permission verification module 314 were to establish a consistency between request data 310 and the extracted portions of local permissioning information 316, and additionally, or alternatively, between countersigned commitment data 284 and each portion of recordation confirmation 308, permission verification module 314 may determine that user 121 possesses operational permission sufficient to request the distribution of assets in accordance with the testamentary instrument of user 101. Responsive to this determination, permission verification module 314 may generate confirmation data 317 indicative of the sufficient operational permission and provide confirmation data 317 as an input to an event verification module 318. In some instances, and in response to the receipt of confirmation data 317, event verification module 318 may perform operations that verify the occurrence of the event, e.g., user 101's death, that triggers the distribution of assets held by user 101 to corresponding beneficiaries in accordance with user 101's testamentary instrument.

For example, event verification module 318 may access distribution request 302 (e.g., as maintained at the temporary location within data repository 132), and extract document data 312, which characterizing the document verifying an occurrence of a triggering event. Examples of the verification document include, but are not limited to, a digital copy of a death certificate issued by a governmental entity or probate order issued by a judicial entity and in some instances, event verification module 318 may process document data 312 and verify the occurrence of the triggering event, e.g., the death of user 101, based on portions of document data 312 (e.g., an incorporated hash value generated by the governmental or judicial entity).

In other instances, event verification module 318 may parse document data to extract a document identifier or an identifier of the governmental or judicial entity (e.g., based on an application of an optical character recognition algorithm or process), and may package the one or more extracted identifiers into a request 320A, which management system 130 may transmit across network 120 to an external computing system 322 associated with the governmental or judicial entity, e.g., using any appropriate communications protocols. A secure programmatic interface of external computing system 322 (not illustrated in FIG. 3A), may receive request 320A, and external computing system 322 may perform operation that determine a validity of the verifying document associated with document data 312 based on, for example, the document identifier. External computing system 322 may package information characterizing the validity of the verification document into a response 320B, which external computing system 322 may transmit across network 120 to management system 130 using any appropriate communications protocol, e.g., via the secure programmatic interface.

Event verification module 318 may receive response 320B, e.g., through the secure programmatic interface, and may perform operations that verify the occurrence of the triggering event, e.g., the death of user 101, based on the information included within response 320B. If event verification module 318 fails to verify the death or user 101 based in the information included within response 320B, or if that information includes an ambiguity or is incomplete (e.g., an incorrect spelling of user 101's name, a missing birthdate, etc.), management system 130 may discard distribution request 302, and may generate and transmit an error message indicative of the established inconsistency across network 120 to client device 122, e.g., via a secure, programmatic interface, for presentation on a corresponding digital interface, e.g., as generated by the one or more executed application programs (not illustrated in FIG. 3A).

Alternatively, if event verification module 318 were to verify the occurrence of the triggering event, e.g., user 101's death, event verification module 318 may generate confirmation data 323 indicative of the verified occurrence, and transmit confirmation data 323 as an input to a parameter confirmation module 324. In some instances, and in response to the receipt of confirmation data 323, parameter confirmation module 324 may perform operations that access managed exchange data 142 (e.g., as maintained within data repository 132), and extract digitally signed testamentary data 242, digitally signed commitment data 244, and digitally signed random numbers 246, which collectively characterize and represent the distribution of assets specified within user 101's testamentary instrument.

Parameter confirmation module 324 may perform additional operations that package digitally signed testamentary data 242, digitally signed commitment data 244, and digitally signed random numbers 246 into corresponding portions of a verification request 326. Parameter confirmation module 324 may also access cryptographic data store 138 (e.g., as maintained within data repository 132), and extract public cryptographic key 281A and private cryptographic key 281B. In some instances, parameter confirmation module 324 may package public cryptographic key 281A into a corresponding portion of verification request 326, and may perform any of the processes described herein to apply a system digital signature 328 to digitally signed testamentary data 242, digitally signed commitment data 244, digitally signed random numbers 246, and public cryptographic key 281A, e.g., using private cryptographic key 281B. Parameter confirmation module 324 may provide digitally signed verification request 326 as an input to routing module 286 of management system 130, which may perform any of the processes described herein to cause management system 130 to transmit digitally signed verification request 326 across network 120 to client device 122, e.g., using any appropriate communications protocol.

Although not illustrated in FIG. 3A, a secure programmatic interface of client device 122, e.g., an application programming interface (API), may receive and route digitally signed verification request 326 to the one or more executed application programs. In some instances, the one or more executed application programs may parse digitally signed verification request 326 to extract public cryptographic key 281A, and may perform any of the exemplary processes described herein to verify system digital signature 328 based on public cryptographic key 281A.

In response to a successful verification of system digital signature 328, the one or more application programs executed by client device 102 may perform operations that access locally stored confirmation data (e.g., as maintained within one or more tangible, non-transitory memories), such as, but not limited to, countersigned commitment data 284. As described herein, countersigned commitment data 284 may include, among other things, commitment data 232 and signature commitment value 283, and the one or more executed application programs may perform operations that extract, from digitally signed commitment data 244 (or from one or more of digitally signed testamentary data 242 or digitally signed random numbers 246), a device digital signature generated and applied by client device 102, such as digital signature 240B. In some instances, the one or more application programs executed by client device 122 may perform any of the exemplary processes described herein to compute a local signature commitment value, e.g., a homomorphic Pedersen commitment value, representative of the digital signature 240B (e.g., based on corresponding portions of digitally signed random numbers 246).

When the local signature commitment value is consistent with signature commitment value 283, the one or more executed application programs may parse digitally signed testamentary data 242 to extract, from corresponding elements of testamentary data 218, the beneficiary arrays of beneficiary identifiers and the distribution arrays specifying the fractional or unit distributions associated with corresponding ones of the beneficiary identifiers. The one or more application programs executed by client device 122 may perform any of the exemplary processes described herein to compute local arrays of commitment values representative of the beneficiary identifiers included within corresponding ones of the beneficiary arrays and representative of the fractional or unit distributions included within corresponding ones of the distribution arrays (e.g., based on corresponding portions of digitally signed random numbers 246).

The one or more executed application programs may also perform operations that extract, from digitally signed commitment data 244, arrays of commitment values representative of the beneficiary identifiers, and arrays of commitment values representative of the fractional or unit distributions specified for beneficiaries. Further, in some instances, the one or more executed application programs may also: (i) compare the local arrays of commitment values representative of the beneficiary identifiers against corresponding ones of the extracted arrays of commitment value; and (ii) compare the local arrays of commitment values representative of the fractional or unit distributions with corresponding ones of the extracted arrays of commitment values.

When the local arrays of commitment values representative of the beneficiary identifiers, and representative of the fractional or unit distributions, are consistent with corresponding ones of the extracted arrays of commitment values, the one or more application programs by client device 122 may perform operations that establish a consistency between the countersigned commitment data immutably recorded onto the distributed ledger (e.g., countersigned commitment data 284, as included within the locally maintained confirmation data) and digitally signed testamentary data 242 maintained securely by management system 130. By way of example, to confirm the established consistency, the one or more application programs executed by client device 122 may generate and apply an additional device digital signature to countersigned commitment data 284, e.g., based on a corresponding private cryptographic key of client device 122, and may package countersigned commitment data 284, the additional device digital signature, and a public cryptographic key of client device 122 into corresponding portions of a verification response, e.g., verification response 332 of FIG. 3B.

Figure 3B:
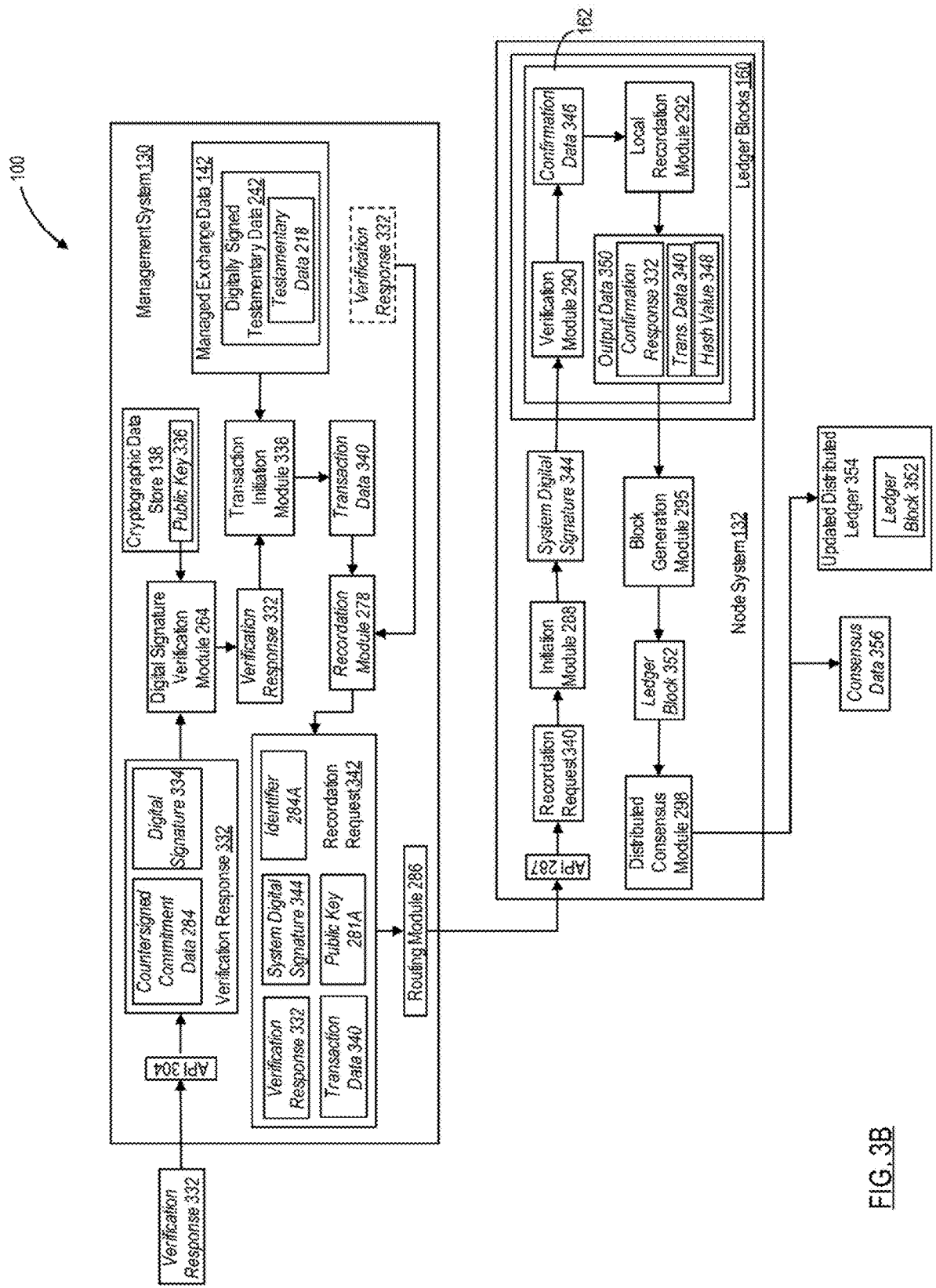

Referring to FIG. 3B, client device 122 may transmit verification response 332 across network 120 to management system 130, e.g., using any appropriate communications protocol, and API 304 of management system 130 may receive and route verification response 332 to signature verification module 264. In some instances, signature verification module 264 may perform operations that verify the additional device digital signature, e.g., digital signature 334, using the public cryptographic key included within verification response 332, e.g., public cryptographic key 336. For example, if signature verification module 264 were unable to verify digital signature 334, signature verification module 264 may determine that an unauthorized third party intercepted or tampered with verification response 332 during transmission to management system 130, or that an unauthorized user or device generated all or a portion of verification response 332. Responsive to this determination (not illustrated in FIG. 3B), management system 130 may discard verification response 332, and may generate and transmit an error message indicative of the failed verification across network 120 to client device 122, e.g., via a secure, programmatic interface for presentation in a corresponding digital interface (not illustrated in FIG. 3B).

Alternatively, if signature verification module 264 were to verify successfully digital signature 334, signature verification module 264 may provide verification response 332 as an input to a transaction initiation module 338 of management system 130. In some instances, transaction initiation module 338 may perform operations that store verification response 332 within a corresponding portion of data repository 132, e.g., within managed exchange data 142, and that associate verification response 332 with corresponding elements of request data 250 (not illustrated in FIG. 3B). In response to the verification of digitally signed testamentary data 242 maintained within managed exchanged data 142 by client device 122, as indicated by digital signature 334 applied to countersigned commitment data 284, transaction initiation module 338 may perform operations that initiate exchanges of data facilitating the distributions of assets held by user 101 to corresponding beneficiaries in accordance with elements of testamentary data 218, e.g., as maintained within digitally signed testamentary data 242.

By way of example, and without limitation, testamentary data 218 may include an identifier of an investment account held by user 101 (e.g., an actual or tokenized account data, etc.), beneficiary identifiers of a spouse and a child of user 101 (e.g., any of the governmental identifiers described herein), and the fractional distributions allocated to each of the spouse and the child from the outstanding balance of the investment account (e.g., sixty-five percent to the spouse, and thirty-five percent to the child). In some instances, transaction initiation module 338 may perform operations that access testamentary data 218, and that initiate data exchanges that facilitate a first electronic transfer of sixty-five percent of the balance the investment account to a designated account associated with the beneficiary identifier of the spouse, and a second electronic transfer of thirty-five percent of the balance the investment account to a designated account associated with the beneficiary identifier of the child. The disclosed embodiments are, however, not limited to these exemplary electronic transfers, and in other instances, transaction initiation module 338 may initiate any additional or alternate data exchanges that facilitate the distribution of assets in accordance with portion of testamentary data 218, e.g., as maintained within managed exchange data 142.

In some instances, transaction initiation module 338 may generate transaction data 340 indicative of the data exchanges initiated in accordance with the elements of digitally signed testamentary data 242 maintained within managed exchange data 142 and may provide transaction data 340 as an input to recordation module 278. Recordation module 278 may receive transaction data 340, and perform operations that access managed exchange data 142 (e.g., as maintained within data repository 132), and extract verification response 332. As described herein, verification response 332 may include countersigned commitment data 284, which itself includes commitment values digitally signed by client device 102 (e.g., that requested a recordation of the commitment values within the distributed ledger data structure) and countersigned by management system 130, and which may be further countersigned by client device 122, e.g., as operated by the executor associated with user 101's testamentary instrument.

Recordation module 278 may perform operations that package verification response 332, transaction data 340, contract identifier 284A, and public cryptographic key 281A of management system 130 into corresponding portions of recordation request 342. Recordation module 278 may also perform operations that, based on private cryptographic key 281B of management system 130, apply a system digital signature 344 to verification response 332, transaction data 340, and contract identifier 284A (and in some instances, public cryptographic key 281A). In some instances, recordation module 278 may provide digitally signed recordation request 342 as an input to a routing module 286 of management system 130, which may obtain a unique network address of each of node systems 150, such as an IP address of node system 152, and perform operations that cause management system 130 to broadcast recordation request 342 across network 120 to each of node systems 150, including node system 152, e.g., using any appropriate communications protocol.

Node system 152 (and each additional or alternate one of node systems 150) may receive recordation request 342 through API 287, which may route recordation request 342 to an initiation module 288. In some instances, and in response to the detection of contract identifier 284A, initiation module 288 may perform operations that invoke the distributed smart contract and thus, the execution of the code elements that establish the distributed smart contract, e.g., as maintained within consistency module 162 of smart contract ledger blocks 160.

One or more processors of node system 152 may access the distributed ledger (e.g., as maintained within ledger data 156 of data repository 154) and execute the code elements maintained within consistency module 162. In other instances, and consistent with the disclosed embodiments, node system 152 may execute an instance of a distributed virtual machine, which accesses the distributed ledger and executes the code elements maintained within consistency module 162 (e.g., based on output data generated by initiation module 288). Upon invocation of the distributed smart contract, initiation module 288 may provide recordation request 342 as an input to consistency module 162, which includes the executable code elements that establish the distributed smart contract.

In some examples, a verification module 290 of consistency module 162 may receive recordation request 342, which includes system digital signature 344, and may perform operations that extract public cryptographic key 281A from supporting data 164 and that verify system digital signature 344 based on public cryptographic key 281A. If verification module 290 were unable to verify system digital signature 344, the distributed smart contract may decline to immutably record verification response 332 and transaction data 340 within one or more additional ledger blocks of the cryptographically secure distributed ledger described herein. In response to this determination (not illustrated in FIG. 3B), consistency module 162 may output data indicative of the unsuccessful verification, which node system 152 may relay back to client device 102, e.g., directly across network 120 or through a programmatic interface established with management system 130.

Alternatively, if verification module 290 were to successfully verify system digital signature 344, verification module 290 may output confirmation data 346 indicative of the successful verification of system digital signature 344. In some instances, confirmation data 346 may include verification response 332 and transaction data 340, and verification module 290 may provide confirmation data 346 as an input to a local recordation module 292, which may process portions of recordation request 342, for submission to the distributed ledger.

For example, local recordation module 292 may process request data 342 to extract verification response 332 and transaction data 340. In some instances, local recordation module 292 may perform operations that generate hash value 348 based on any application of any of the hash algorithms described herein to verification response 332 and transaction data 340. Local recordation module 292 may generate output data 350, which includes verification response 332, transaction data 340, and hash value 348, and provide output data 294 as an input to a block generation module 295 of node system 152. For example, block generation module 295 may perform operations that generate a new ledger block 352 that includes verification response 332, transaction data 340, and hash value 348. Further, as illustrated in FIG. 3B, new ledger block 352 may also include temporal data 296A characterizing a time or date at which block generation module 295 added verification response 332 and transaction data 340 to new ledger block 296.

Node system 152 may perform additional operations that append new ledger block 352 to a prior version of the permissioned block-chain ledger to generate a latest, longest version of the permissioned block-chain ledger (e.g., an updated distributed ledger 354). For example, the additional operations may be established through a distributed consensus among the other node systems operating within environment 100, and may include, but are not limited to, the calculation of an appropriate proof-of-work or proof-of-stake by a distributed consensus module 298 prior to the other node systems. In certain aspects, node system 152 may broadcast evidence of the calculated proof-of-work or proof-of-stake to the other node systems across network 120 (e.g., as consensus data 356).

Node system 152 may also broadcast updated distributed ledger 354, which represents the latest, longest version of the distributed ledger, to the other node systems operating within environment 100 and additionally or alternatively, to each of the network-connected systems that participate in the blockchain network, such as management system 130. Further, although not illustrated in FIG. 3B, node system 152 may generate and transmit data confirming the successful recordation of verification response 332 and transaction data 340 onto updated distributed ledger 354 across network 120 to management system 130, e.g., across a secure programmatic interface. In some instances, and consistent with the disclosed embodiments, management system 130 may perform operations that transmit all, or a portion, of the confirmation data across network 120 to client device 102.

Figure 4:
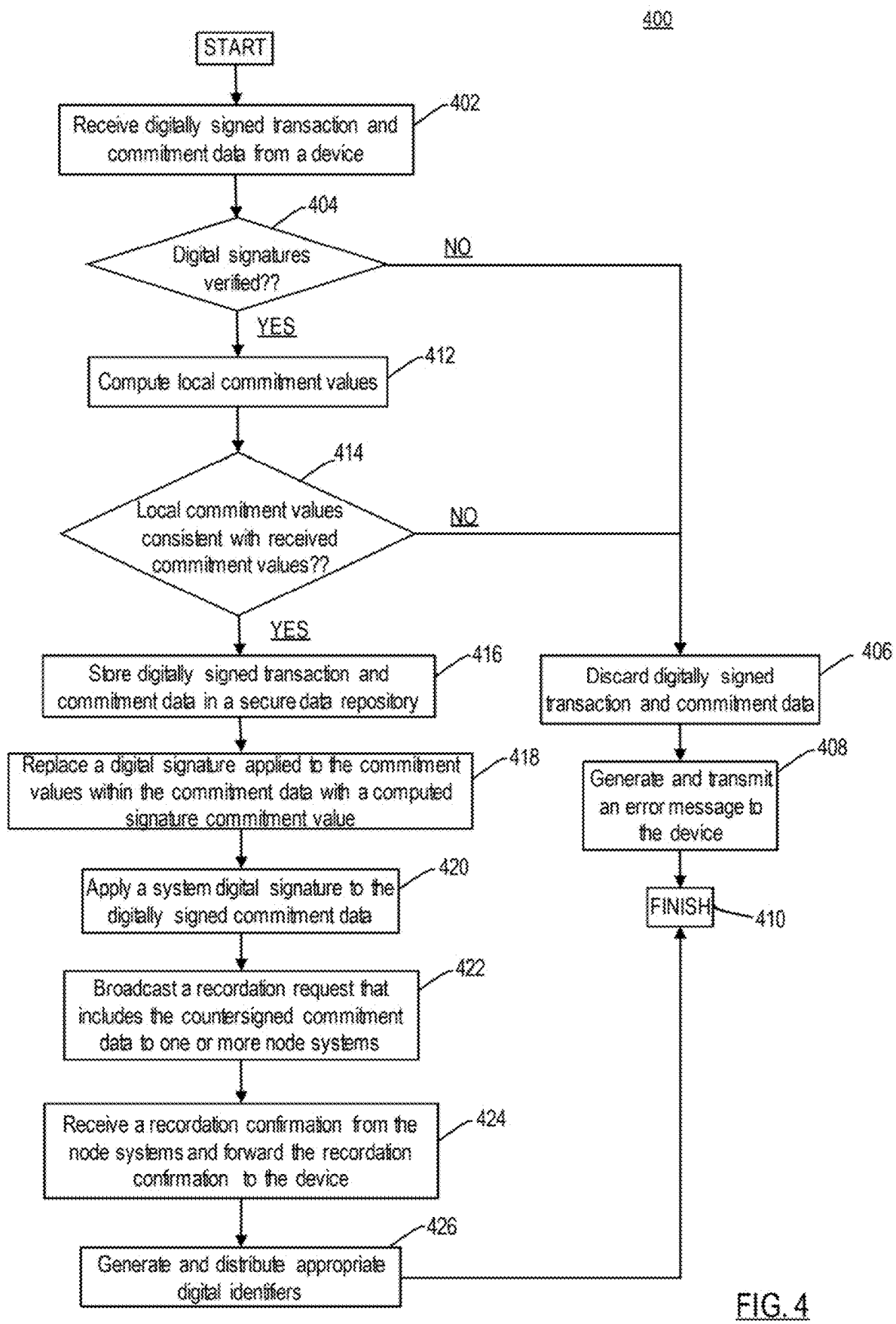
FIGS. 4 and 5 are flowcharts of exemplary processes for dynamically managing exchanges of data using a distributed ledger and a homomorphic commitment scheme, consistent with the disclosed embodiments.

FIG. 4 is a flowchart of an exemplary process 400 for dynamically managing exchanges of data using a distributed ledger and a homomorphic commitment scheme. In some examples, a network-connected computing system, such as management system 130 of FIG. 1, may perform one or more of the exemplary steps of process 400, which, among other things, obtain data characterizing an exchange of data capable of initiation in response to a verified occurrence of a triggering event, securely maintain values of parameters that characterize the data exchange within a secure, permissioned data repository, and broadcast commitment data representative of the parameter values to one or more node systems for recordation within discrete elements of a distributed ledger, e.g., a publicly accessible or permissioned distributed ledger.

Referring to FIG. 4, management system 130 may perform operations that receive, through a corresponding programmatic interface, elements of digitally signed transaction data and commitment data from a network-connected device, such as client device 102 of FIG. 1 (e.g., in step 402). As described herein, one or more application programs executed by client device 102, such as commitment engine 108 of FIG. 1, may perform any of the exemplary processes described herein to receive all or a portion of the transaction data (e.g., based input provided by user 101 to client device 102 in response to a digital interface generated and presented by executed commitment engine 108), to generate all or a portion of the commitment data, and to apply a corresponding digital signature based on a private cryptographic key associated with user 101 (e.g., as generated and provisioned to client device 102 by management system 130).

In some instances, the transaction data may specify a value of one or more parameters that characterize the data exchange, along with additional or alternate information that identifies, characterizes, or describes the data exchange. Further, the commitment data may include: (i) an array of commitment vales determined in accordance with a homomorphic Pedersen commitment scheme; and (ii) an array of random numbers that facilitate the determination of corresponding ones of the commitment values. As described herein, the commitment values, may represent corresponding ones of the parameter values characterizing the data exchange, and commitment engine 108, when executed by client device 102, may perform operations that compute the random numbers and determine the commitment values using any of the exemplary processes described herein.

In some exemplary embodiments, as described herein, the data exchange may facilitate a distribution of assets in accordance with a testamentary instrument (e.g., a will) generated by, or one behalf of, a user that operates client device 102, e.g., user 101. For instance, the testamentary instrument may include information that identifies and characterizes one or more assets held by user 101, such as, but not limited to, financial services accounts held by user 101 and issued by corresponding financial institutions, units of cryptocurrency held by user 101, and real estate or other tangible elements of physical property. The testamentary instrument may also include information that characterizes a distribution of each identified assets to one or more corresponding beneficiaries, e.g., on a fraction basis or on a unit basis, along with any conditions imposed on the distribution of the identified assets, e.g., a beneficiary age, marital status, etc.

For example, and for each of the assets identified within user 101's testamentary instrument, the elements of the transaction data may include: (i) a corresponding asset identifier, such as a tokenized or actual account number associated with a financial services account held by user 101, a public cryptographic key associated with a cryptocurrency account held by user 101, or any of the unique identifiers of real estate physical property described herein; (ii) a beneficiary identifier associated with each of the one or more corresponding beneficiaries, such as, but not limited to, an alphanumeric login credential or a government-issued identifier (e.g., a social security number, a driver's license number, a passport number, etc.); (iii) a fractional or unit distribution specified within the testamentary instrument for each of the one or more corresponding beneficiaries; and (iv) any conditions imposed on the distribution of the identified asset to one, or more, of the corresponding beneficiaries. Additionally, in some examples, the transaction data may also include document data associated with all or a portion of the testamentary instrument, such as a hash value representative of image data or a PDF file.

In further examples, management system 130 may also receive, in step 402, permissioning data that identifies and characterizes one or more individuals permitted by user 101 to access all or a portion of the digitally signed transaction and the digitally signed commitment data (e.g., as maintained locally by management system 130 or immutably recorded onto the cryptographically secure distributed ledger data structure), or to request a performance of operations involving portions of the digitally signed transaction and the digitally signed commitment data (e.g., an initiation of one or more exchanges of data facilitating the distribution of assets specified within user 101's testamentary instrument). As described herein, the permitted individuals may include, but are not limited to, a beneficiary, an individual designated by user 101 as an executor of the testamentary instrument, or an attorney associated with the testamentary instrument, and for each of the permitted individuals, the permissioning data may include a unique identifier (e.g., a digital identifier generated by management system 130, an alphanumeric login credential, a government-issued identifier, etc.) and information characterizing the granted permission (e.g., read-only access to distributed ledger data structure, full read and write access, or an ability to initiate data exchanges on a temporally limited or unlimited basis). Further, in some instances, the digitally signed commitment data may also include a commitment value, e.g., a homomorphic Pedersen commitment value, representative of the permissioning data.

Referring back to FIG. 4, management system 130 may perform operations that verify the digital signatures applied to the commitment and transaction data based on a public cryptographic key associated with user 101 (e.g., in step 404). In one example, if management system 130 were unable to verify one or more of the applied digital signatures (e.g., step 404; NO), management system 130 may perform operations that discard the digitally signed transaction and commitment data (e.g., in step 406), and generate and transmit an error message indicative of the failed verification across network 120 to client device 102, e.g., via a secure, programmatic interface (e.g., in step 408). As described herein, client device 102 may perform any of the exemplary processes described herein to generate and present interface elements representative of the error message on a corresponding digital interface, e.g., as generated by executed commitment engine 108. Exemplary process 400 is then complete in step 410.

Alternatively, if management system 130 were to verify successfully each of the applied digital signatures (e.g., step 404; YES), management system 130 may perform any of the exemplary processes described herein to compute local commitment values based on corresponding portions of the digitally signed transaction data and based on corresponding random numbers extracted from the digitally signed commitment data (e.g., in step 412). Management system 130 may also perform any of the exemplary processes described herein to verify a consistency between each of the locally computed commitment values and corresponding ones of the received commitment values, as extracted from the digitally signed commitment data (e.g., in step 414).

If management system 130 were to detect an inconsistency between one or more local commitment values and corresponding ones of the received commitment values (e.g., step 414; NO), exemplary process 400 may pass back to step 406, and management system 130 may perform operations that discard the digitally signed transaction and commitment data. As described herein, management system 130 generate and transmit an error message indicative of the failed verification across network 120 to client device 102, e.g., via a secure, programmatic interface, for presentation in the corresponding digital interface (e.g., in step 408). Exemplary process 400 is then complete in step 410.

Alternatively, if management system 130 were to establish a consistency between the locally computed and received commitment values (e.g., step 414; YES), management system 130 may perform any of the exemplary processes described herein to store all or a portion of the digitally signed transaction data and the digitally signed commitment data within a secure, locally accessible data repository, such as managed exchange data 142 of FIG. 1 (e.g., in step 416). Further, in step 416, management system 130 may also store, within the secure, locally accessible data repository, all or a portion of the received permissioning data, one or more unique identifiers of user 101 or client device 102 (e.g., the unique digital identifier, the alphanumeric login credential, the network address of client device 102, etc.), and temporal data characterizing a time or date at which management system 130 stored the digitally signed transaction data and the digitally signed commitment data within the secure, locally accessible data repository.

In some instances, management system 130 may further process the digitally signed commitment data to extract the digitally signed commitment values, and using any of the example processes described herein, management system 130 may compute an additional commitment value, e.g., a signature commitment value, representative of the verified digital signature applied to the commitment values, and replace that verified digital signature with the signature commitment value (e.g., in step 418). Management system 130 may also perform any of the exemplary processes described herein to generate, and apply, an additional digital signature, e.g., a system digital signature, to the digitally signed commitment data (e.g., in step 420). As described herein, the application of the system digital signature to the digitally signed commitment data may enable management system 130 to countersign the commitment values, which may confirm an integrity and an accuracy of the commitment values received from client device 102.

Management system 130 may package the countersigned commitment data into a corresponding portion of a recordation request, which management system 130 may broadcast across network 120 to each of node systems 150, including node system 152 (e.g., in step 422). In some instances, the recordation request may also include a public cryptographic key of management system 130 and additionally, or alternatively, an identifier of a distributed smart contract associated with the distributed ledger data structure.

As described herein, each of node systems 150, including node system 152, may receive the recordation request, and based on a detected presence of the identifier, may perform operations that invoke the distributed smart contract and thus, the execution of the code elements that establish the distributed smart contract. In some instances, node systems 150, including node system 152, may perform any of the exemplary processes described herein to verify the applied system digital signature (e.g., based on a public cryptographic key of management system 130, maintained locally or packaged into the recordation request) and to verify a consistency of all, or a portion, of the digitally signed commitment data (e.g. based on an application of a zero-knowledge equality proof to values of homomorphic Pedersen commitments representative of the fractional or unit distributions).

In response to a successful verification of the system digital signature and the consistency of the digitally signed commitment values, node systems 150 may perform any of the exemplary, consensus-based processes described herein to incorporate the countersigned commitment data, and in some instances, the public cryptographic key, into a new ledger block of the distributed ledger data structure, along with temporal data identifying a time or at date which the countersigned commitment data was recorded onto the distributed ledger data structure. Further, one or more of node systems 150 may generate a recordation verification confirming the successful recordation of the countersigned commitment data onto the distributed ledger across network 120 to management system 130, e.g., across a secure programmatic interface.

Referring back to FIG. 4, management system 130 may receive the recordation verification from one or more of node systems 150 and may route the recordation verification across network 120 to client device 102, e.g., across a secure, programmatic interface using any appropriate communications protocol (e.g., in step 424). For example, and as described herein, the recordation verification may include the countersigned commitment values, the temporal data, and a corresponding hash value that were immutably recorded onto the new ledger block, and upon receipt by client device 102, executed commitment engine 108 may store the recordation verification within a tangible, non-transitory memory, such as a portion of application data 112.

Management system 130 may also perform any of the exemplary processes described herein to generate a digital identifier for one, or more, of the permitted individuals identified within the locally maintained permissioning data, and to provide the digital identifiers to network-connected devices associated with these individuals, either alone or in conjunction with the recordation verification (e.g., in step 426). As described herein, the digital identifier may include, but is not limited to, a digital token, a cryptogram, a cryptographic key, a random number, or other unique element of cryptographic data structure (e.g., data specifying a matrix barcode, such as a QR code). Further, management system 130 may generate the unique digital identifier based on an application of one or more tokenization schemes, cryptographic key generation schemes, or other algorithms to locally maintained identifiers of the individuals, such as, but not limited to, an alphanumeric login or authentication credential, a biometric credential, a government-issued identifier, or a network address, as maintained within a corresponding portion of the permissioning data. Exemplary process 400 is then complete in step 410.

Figure 5:
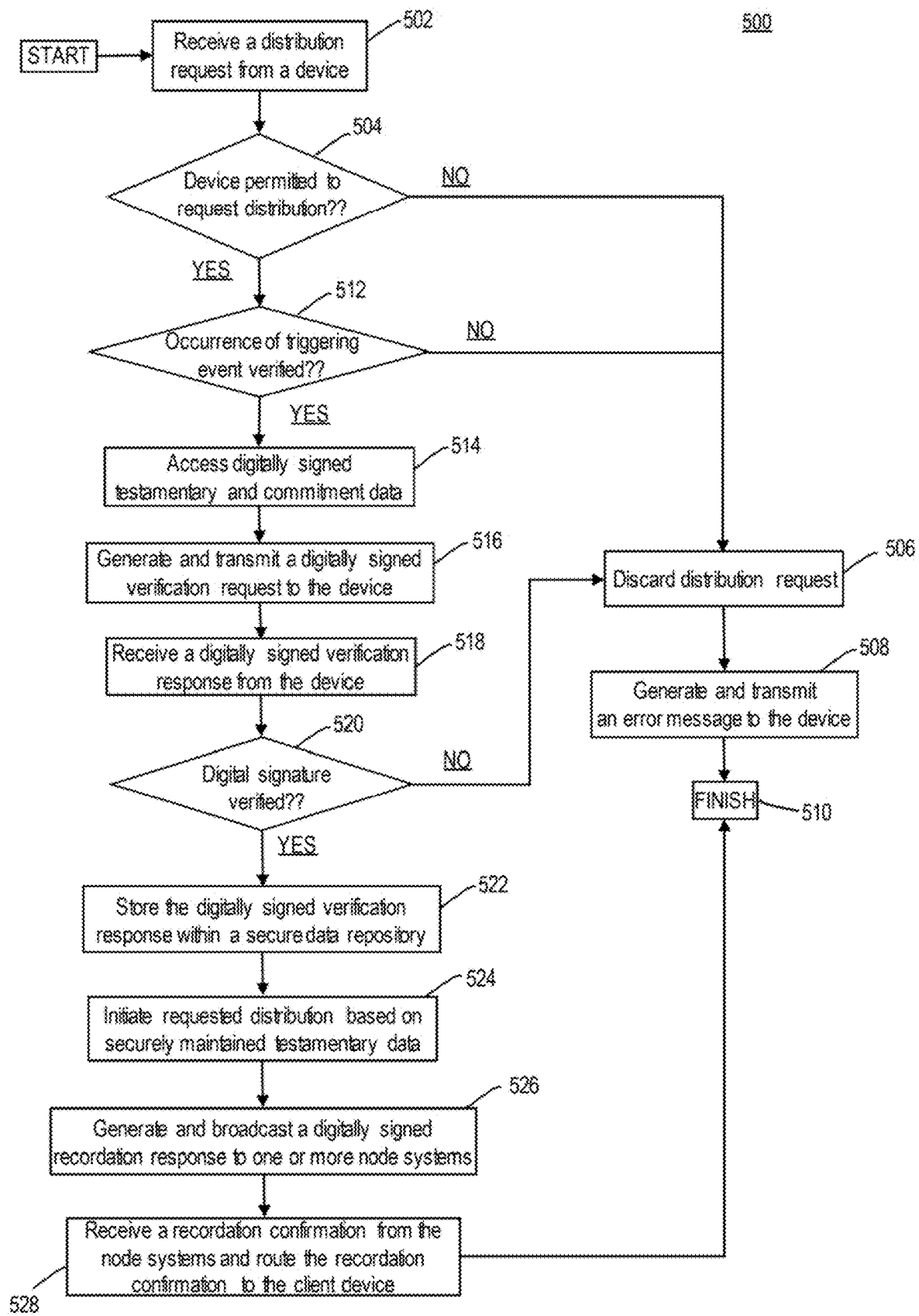

FIG. 5 is a flowchart of an additional exemplary process 500 for managing exchanges of data using a distributed ledger and a homomorphic commitment scheme. In some examples, a network-connected computing system, such as management system 130 of FIG. 1, may perform one or more of the exemplary steps of process 500, which, among other things, receive a request to initiate one or more exchanges of data consistent with securely maintained portions of testamentary data, determine whether a network-connected device associated with the request, or a user associated with the network-connected device, is permissioned to initiate the data exchange, and in response to a verified occurrence of an event triggering the data exchange, and to a receipt of data confirming an integrity of the securely maintained transaction data, perform operations that initiate the data exchange in accordance with one or more elements of the securely maintained testamentary data.

Referring to FIG. 5, management system 130 may receive a request (e.g., a distribution request) to initiate one or more exchanges of data that are consistent with portions of securely maintained testamentary data and response to a detected occurrence of a triggering event (e.g., in step 502). By way of example, the one or more data exchange may facilitate a distribution of assets in accordance with a testamentary instrument (e.g., a will) generated by, or one behalf of, and executed by user 101. Further, and as described herein, the distribution request may correspond to a distribution request generated and transmitted by an additional network-connected client device operating within environment 100, such as client device 122 operated by user 121, in response to a detected occurrence of a triggering event associated with the testamentary instrument, such as a death of user 101.

As described herein, user 121 may correspond to an executor of the testamentary instrument (e.g., as designated by user 101), and the received distribution request may include an identifier of user 121, such as, but not limited to, one of the digital identifiers described herein, an alphanumeric login credential of user 121, or a network address of client device 122, along with additional information identifying or characterizing the requested distribution of assets. Further, in some instances, the received distribution request may also include all or a portion of a recordation verification generated by one or more of node systems 150 in response to a successful recordation of countersigned commit values representative of the testamentary instrument within a corresponding ledger block of the distributed ledger. Additionally, or alternatively, the distribution request may also include document data (e.g., image data, a PDF file, etc.) identifying or characterizing a physical document associated with the triggering event, such as, but not limited to, a death certificate issued by a governmental entity or a probate order issued by a judicial entity.

In some instances, and based on portions of the received distribution request, management system 130 may perform any of the exemplary processes described herein to verify that user 121 (and/or client device 122) is permitted to request the distribution of assets in accordance with user 101's testamentary instrument (e.g., in step 504). For example, and as described herein, management system 130 may parse the distribution request to extract the user identifier (and any additional or alternate user or device identifiers), and may access the locally maintained permissioning data 214 and identify one or more data records that include or reference the digital identifier and, in some instances, the user and/or device identifiers. Management system 130 may also extract, from the one or more identified data records, local permissioning information that characterizes one or more access or operational permission granted to user 121 by user 101.

If permission verification module 314 were to establish an inconsistency between the requested distribution and the extracted portions of local permissioning information (e.g., step 504; NO), management system 130 may determine that user 121 lacks operational permission sufficient to request the distribution of assets in accordance with the testamentary instrument of user 101. Responsive to this determination, management system 130 may discard the received distribution request (e.g., in step 506), and may generate and transmit an error message indicative of the established inconsistency across network 120 to client device 122, e.g., via a secure, programmatic interface, for presentation on a corresponding digital interface (e.g., in step 508). Exemplary process 500 is then complete in step 510.

Alternatively, if management system were to establish a consistency between the requested distribution and the extracted portions of the local permissioning information (e.g., step 504; YES), management system 130 may determine that user 121 possesses operational permission sufficient to request the distribution of assets in accordance with the testamentary instrument of user 101. Responsive to this determination, management system 130 may perform any of the exemplary processes described herein to verify the occurrence of the event, e.g., user 101's death, that triggers the distribution of assets held by user 101 to corresponding beneficiaries in accordance with user 101's testamentary instrument (e.g., in step 512).

If management system 130 were unable to verify the occurrence of the triggering event, e.g., the death of user 101, using any of the exemplary processes described herein (e.g., step 512; NO), exemplary process 500 may pass back to step 506, and management system 130 may discard the received distribution request. As described herein, management system 130 may generate and transmit an error message indicative of the established inconsistency across network 120 to client device 122, e.g., via a secure, programmatic interface, for presentation on a corresponding digital interface (e.g., in step 508), and exemplary process 500 is complete in step 510.

Alternatively, if management system 130 were to verify the occurrence of the triggering event, e.g., user 101's death (e.g., step 512; YES), management system 130 may access one or more securely maintained portions of digitally signed testamentary data and/or digitally signed commitment data (e.g., as maintained within managed exchange data 142), which collectively characterize and represent the distribution of assets specified within user 101's testamentary instrument (e.g., in step 514). Further, and in step 516, management system 130 may also perform operations that: package the securely maintained portions of digitally signed testamentary data and/or digitally signed commitment data into corresponding portions of a verification request, along with a public cryptographic key of management system 130; generate and apply a digital signature to the verification request based on a private cryptographic key of management system 130; and transmit the digitally signed verification request across network 120 to client device 122, e.g., through a secure, programmatic interface using any appropriate communications protocol.

As described herein, client device 122 may receive the digitally signed verification request, e.g., across a secure programmatic interface, and one or more application programs executed by client device 122 that perform any of the exemplary processes described herein to verify the applied system digital signature, e.g., based on the public cryptographic key of management system 130. In further instances, the one or more application programs executed by client device 122 may also perform any of the exemplary processes described herein to verify an accuracy of the commitment values (e.g., as maintained within digitally signed commitment data) that represent the digital signature of user 101 or client device 102, the beneficiary identifiers, and additionally, or alternatively, the fractional or unit distributions of the identified assets.

In response to the verified system digital signature, and to the verified accuracy of the commitment values, the one or more application programs executed by client device 122 may access the locally maintained recordation verification (e.g., as provisioned to client device 102 by management system 130 using any of the exemplary processes described herein), and generate and apply an additional device digital signature to the countersigned commitment values included within the recordation verification. As described herein, the one or more application programs executed by client device 122 may perform operations that package the countersigned commitment data, the additional device digital signature, and a public cryptographic key of client device 122 into corresponding portions of a verification response, which client device 122 may transmit across network 120 to management system 130, e.g., through a secure, programmatic interface using any appropriate communication protocol.

Referring back to FIG. 5, management system 130 may receive the verification response from client device 122 (e.g., in step 518), and may perform operations that verify the additional device digital signature using the public cryptographic key of client device 122 (e.g., in step 520). For example, if management system 130 were to fail to verify the additional device digital signature (e.g., step 520; NO), exemplary management system 130 may determine that an unauthorized third party intercepted or tampered with the verification response, or that an unauthorized user or device generated all or a portion of the verification response. Responsive to this determination, management system 130 may discard the received distribution request (e.g., in step 506), and may generate and transmit an error message indicative of the established inconsistency across network 120 to client device 122, e.g., via a secure, programmatic interface, for presentation on a corresponding digital interface (e.g., in step 508). Exemplary process 500 is then complete in step 510.

Alternatively, if management system 130 were to verify successfully the additional device digital signature (e.g., step 520; YES), management system 130 may perform operations that store the verification response within a corresponding portion of a secure data repository, e.g., within managed exchange data 142 (e.g., in step 522). Management system 130 may also perform any of the exemplary processes described herein to initiate exchanges of data that facilitate the distributions of the assets held by user 101 to corresponding beneficiaries in accordance with elements of the digitally signed testamentary data, e.g., as stored within the secure data repository (e.g., in step 524).

Further, in some instances, management system 130 may package the verification response and information characterizing the initiated data exchanges into a corresponding portion of a recordation request, along with a public cryptographic key of management system 130 and additionally, or alternatively, an identifier of a distributed smart contract associated with the distributed ledger (e.g., in step 526). Further, in step 526, management system 130 may perform any of the exemplary processes described herein to apply an additional system digital signature to the recordation request (e.g., based on the private cryptographic key of management system 130), and broadcast the digitally signed recordation request across network 120 to each of node systems 150, including node system 152.

As described herein, each of node systems 150, including node system 152, may receive the recordation request, and based on a detected presence of the identifier, may perform operations that invoke the distributed smart contract and thus, the execution of the code elements that establish the distributed smart contract. In some instances, node systems 150, including node system 152, may perform any of the exemplary processes described herein to verify the additional system digital signature (e.g., based on a public cryptographic key of management system 130, maintained locally or packaged into the recordation request). In response to a successful verification of the additional system digital signature, node systems 150 may perform any of the exemplary, consensus-based processes described herein to incorporate the verification response, the information characterizing the initiated data exchanges, countersigned commitment data, and in some instances, the public cryptographic key, into a new ledger block of the distributed ledger data structure, along with temporal data identifying a time or at date which the verification response and the transaction information were recorded onto the distributed ledger data structure.

Further, one or more of node systems 150 may generate a recordation verification confirming the successful recordation of the verification response, the transaction information, and the temporal data onto the distributed ledger across network 120 to management system 130, e.g., across a secure programmatic interface. Referring back to FIG. 5, management system 130 may receive the recordation verification from one or more of node systems 150 and may route the recordation verification across network 120 to client device 122, e.g., across a secure, programmatic interface using any appropriate communications protocol (e.g., in step 528). Exemplary process 500 is then complete in step 510.

III. Exemplary Hardware and Software Implementations

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification, including, but not limited to, commitment engine 108, transaction initiation module 206, commitment generation module 224, random number generator 226, digital signature module 236, recordation module 248, routing module 252, API 260, management module 262, digital signature verification module 264, commitment verification module 270, recordation module 278, routing module 286, API 287, initiation module 288, verification module 290, local recordation module 292, block generation module 295, distributed consensus module 298, API 304, permission verification module 314. Event verification module 318, parameter confirmation module 324, and transaction initiation module 338, can be implemented as one or more computer programs, i.e., one or more modules of computer program instructions encoded on a tangible non transitory program carrier for execution by, or to control the operation of, a data processing apparatus (or a computer system).

Additionally, or alternatively, the program instructions can be encoded on an artificially generated propagated signal, such as a machine-generated electrical, optical, or electromagnetic signal that is generated to encode information for transmission to suitable receiver apparatus for execution by a data processing apparatus. The computer storage medium can be a machine-readable storage device, a machine-readable storage substrate, a random or serial access memory device, or a combination of one or more of them.

The terms "apparatus," "device," and "system" refer to data processing hardware and encompass all kinds of apparatus, devices, and machines for processing data, including by way of example a programmable processor, a computer, or multiple processors or computers. The apparatus, device, or system can also be or further include special purpose logic circuitry, such as an FPGA (field programmable gate array) or an ASIC (application-specific integrated circuit). The apparatus, device, or system can optionally include, in addition to hardware, code that creates an execution environment for computer programs, such as code that constitutes processor firmware, a protocol stack, a database management system, an operating system, or a combination of one or more of them.

A computer program, which may also be referred to or described as a program, software, a software application, a module, a software module, a script, or code, can be written in any form of programming language, including compiled or interpreted languages, or declarative or procedural languages, and it can be deployed in any form, including as a stand-alone program or as a module, component, subroutine, or other unit suitable for use in a computing environment. A computer program may, but need not, correspond to a file in a file system. A program can be stored in a portion of a file that holds other programs or data, such as one or more scripts stored in a markup language document, in a single file dedicated to the program in question, or in multiple coordinated files, such as files that store one or more modules, sub-programs, or portions of code. A computer program can be deployed to be executed on one computer or on multiple computers that are located at one site or distributed across multiple sites and interconnected by a communication network.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, such as an FPGA (field programmable gate array) or an ASIC (application-specific integrated circuit).

Computers suitable for the execution of a computer program include, by way of example, general or special purpose microprocessors or both, or any other kind of central processing unit. Generally, a central processing unit will receive instructions and data from a read-only memory or a random-access memory or both. The essential elements of a computer are a central processing unit for performing or executing instructions and one or more memory devices for storing instructions and data. Generally, a computer will also include, or be operatively coupled to receive data from or transfer data to, or both, one or more mass storage devices for storing data, such as magnetic, magneto-optical disks, or optical disks. However, a computer need not have such devices. Moreover, a computer can be embedded in another device, such as a mobile telephone, a personal digital assistant (PDA), a mobile audio or video player, a game console, a Global Positioning System (GPS) receiver, or a portable storage device, such as a universal serial bus (USB) flash drive, to name just a few.

Computer-readable media suitable for storing computer program instructions and data include all forms of non-volatile memory, media and memory devices, including by way of example semiconductor memory devices, such as EPROM, EEPROM, and flash memory devices; magnetic disks, such as internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display unit, such as a CRT (cathode ray tube) or LCD (liquid crystal display) monitor, for displaying information to the user and a keyboard and a pointing device, such as a mouse or a trackball, by which the user can provide input to the computer. Other kinds of devices can be used to provide for interaction with a user as well; for example, feedback provided to the user can be any form of sensory feedback, such as visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser.

Implementations of the subject matter described in this specification can be implemented in a computing system that includes a back-end component, such as a data server, or that includes a middleware component, such as an application server, or that includes a front-end component, such as a computer having a graphical user interface or a Web browser through which a user can interact with an implementation of the subject matter described in this specification, or any combination of one or more such back-end, middleware, or front-end components. The components of the system can be interconnected by any form or medium of digital data communication, such as a communication network. Examples of communication networks include a local area network (LAN) and a wide area network (WAN), such as the Internet.

The computing system can include clients and servers. A client and server are generally remote from each other and typically interact through a communication network. The relationship of client and server arises by virtue of computer programs running on the respective computers and having a client-server relationship to each other. In some implementations, a server transmits data, such as an HTML page, to a user device, such as for purposes of displaying data to and receiving user input from a user interacting with the user device, which acts as a client. Data generated at the user device, such as a result of the user interaction, can be received from the user device at the server.

While this specification includes many specifics, these should not be construed as limitations on the scope of the invention or of what may be claimed, but rather as descriptions of features specific to particular embodiments of the invention. Certain features that are described in this specification in the context of separate embodiments may also be implemented in combination in a single embodiment. Conversely, various features that are described in the context of a single embodiment may also be implemented in multiple embodiments separately or in any suitable sub-combination. Moreover, although features may be described above as acting in certain combinations and even initially claimed as such, one or more features from a claimed combination may in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems may generally be integrated together in a single software product or packaged into multiple software products.

In each instance where an HTML file is mentioned, other file types or formats may be substituted. For instance, an HTML file may be replaced by an XML, JSON, plain text, or other types of files. Moreover, where a table or hash table is mentioned, other data structures (such as spreadsheets, relational databases, or structured files) may be used.

Various embodiments have been described herein with reference to the accompanying drawings. It will, however, be evident that various modifications and changes may be made thereto, and additional embodiments may be implemented, without departing from the broader scope of the disclosed embodiments as set forth in the claims that follow.

Further, other embodiments will be apparent to those skilled in the art from consideration of the specification and practice of one or more embodiments of the present disclosure. It is intended, therefore, that this disclosure and the examples herein be considered as exemplary only, with a true scope and spirit of the disclosed embodiments being indicated by the following listing of exemplary claims.

What is claimed is:

1. An apparatus, comprising:
   a communications unit;
   a storage unit storing instructions; and
   at least one processor coupled to the communications unit and the storage unit, the at least one processor being configured to execute the instructions to:
      obtain information associated with an exchange of data, the data exchange being capable of initiation by the apparatus in response to an occurrence of a triggering event, and the information comprising parameter values that characterize the data exchange, first commitment values representative of the parameter values, and a first digital signature applied to the parameter values and the first commitment values;
      in response to a verification of the first digital signature, store the information within a portion of the storage unit and apply a second digital signature to commitment data that includes the first commitment values and a second commitment value representative of the first digital signature; and
      generate and transmit, via the communications unit, a first signal that includes the commitment data and the second digital signature to a computing system, the first signal comprising additional information that causes the computing system to execute instructions included within a distributed ledger, and the executed instructions causing the computing system to perform operations that, in response to a verification of the second digital signature, generate an element of distributed ledger that includes the commitment data and the second digital signature.

2. The apparatus of claim 1, wherein:
the at least one processor is further configured to receive, via the communications unit, a second signal that includes the information from a device associated with the data exchange, the device being configured to compute each of the first commitment values based on a corresponding one of the parameter values and a corresponding first random number; and
the information further comprises the first random numbers associated with the first commitment values, the first digital signature being applied to the parameter values, the first commitment values, and the first random numbers.

3. The apparatus of claim 2, wherein the at least one processor is further configured to:
compute second commitment values based on corresponding ones of the parameter values and the first random numbers;
establish a consistency between the first commitment values and corresponding ones of the second commitment values; and
in response to the verification of the first digital signature, and in response to the established consistency, store the information within the portion of the storage unit and apply the second digital signature to the commitment data.

4. The apparatus of claim 2, wherein the at least one processor is further configured to:
compute the second commitment value based on the first digital signature and a second random number; and
perform operations that store the second commitment value and the second random number within the portion of the storage unit.

5. The apparatus of claim 4, wherein at least one of the first or second commitment values correspond to a homomorphic Pedersen commitment value.

6. The apparatus of claim 1, wherein:
the information further comprises a hash value representative of a document associated with the data exchange; and
the at least one processor is further configured to:
apply the second digital signature to the commitment data and to the hash value; and
generate and transmit, via the communications unit, a second signal that includes the commitment data, the hash value, and the second digital signature to the computing system, the executed instructions causing the computing system to perform operations that, in response to a verification of the second digital signature, generate the additional element of the distributed ledger that includes the commitment data, the hash value, and the second digital signature.

7. The apparatus of claim 1, wherein the second digital signature corresponds to a digital ring signature.

8. The apparatus of claim 1, wherein the executed instructions further cause the computing system to:
verify the second digital signature and determine that a subset of the first commitment values satisfy a consistency condition; and in response to the verification of the second digital signature, and in response to the determination that the subset of the first commitment values satisfy the consistency condition, generate the additional element of the distributed ledger that includes the commitment data and the second digital signature.

9. The apparatus of claim 1, wherein:
the obtained information further comprises permissioning information generated by a first device associated with the data exchange, the permissioning information comprising an identifier of a second device and data specifying at least one of an access permission or an operational permission granted to the second device by the first device; and
in response to a verification of the first digital signature, the at least one processor is further configured to perform operations that store the permissioning information within the portion of the storage unit.

10. The apparatus of claim 9, wherein the at least one processor is further configured to:
receive, via the communication unit, a second signal from the second device, the second signal comprising a request to an initiate an exchange of data, and the request comprising an identifier of the second device;
load the permissioning information from the storage unit, and based on the permissioning information and the second device identifier, establish a permission of the second device to request the initiation of the data exchange, the established permission being granted to the second device by the first device; and
in response to the established permission, perform operations that verify the occurrence of the triggering event associated with the data exchange.

11. The apparatus of claim 10, wherein the at least one processor is further configured to:
in response to the verification of the occurrence of the triggering event, load the information associated with the data exchange from the storage unit;
transmit the information to, and receive a response from, the second device via the communications unit, the response comprising verification data indicative of an accuracy of the transmitted information; and
based on the verification data, perform operations that initiate the data exchange in accordance with the parameter values.

12. The apparatus of claim 10, wherein:
the triggering event corresponds to a death of a user of the first device;
the second signal further comprises documentary data associated with a document that verifies the death of the first user; and
the at least one processor is further configured to transmit a request to, and receive an additional response from, an additional computing system associated with the document via the communications unit, the request comprising at least a portion of the documentary data, and the additional response verifying the occurrence of the death of the first user.

13. A computer-implemented method, comprising:
obtaining, by at least one processor of an apparatus, information associated with an exchange of data, the data exchange being capable of initiation by the apparatus in response to an occurrence of a triggering event, and the information comprising parameter values that characterize the data exchange, first commitment values representative of the parameter values, and a first digital signature applied to the parameter values and first commitment values;

in response to a verification of the first digital signature, and by the at least one processor, storing the information within a portion of a storage unit and applying a second digital signature to commitment data that includes the first commitment values and a second commitment value representative of the first digital signature; and generating and transmitting, by the at least one processor, a first signal that includes the commitment data and the second digital signature to a computing system, the first signal comprising additional information that causes the computing system to execute instructions included within a distributed ledger, and the executed instructions causing the computing system to perform operations that, in response to a verification of the second digital signature, generate an element of distributed ledger that includes the commitment data and the second digital signature.

14. An apparatus, comprising:

a communications unit;

a storage unit storing instructions; and at least one processor coupled to the communications unit and the storage unit, the at least one processor being configured to execute the instructions to:

receive, via the communications unit, a first signal from a first device that includes a request to an initiate an exchange of data, the data exchange being associated with an occurrence of a triggering event;

perform operations that verify the occurrence of the triggering event associated with the data exchange;

in response to the verification of the occurrence of the triggering event, load, from the storage unit, information associated with the data exchange, the information comprising parameter values that characterize the data exchange, first commitment values representative of the parameter values, and a first digital signature applied to the parameter values and first commitment values;

transmit the information to, and receive a response from, the first device via the communications unit, the response comprising verification data indicative of an accuracy of the transmitted information; and based on the verification data, perform additional operations that initiate the data exchange in accordance with one or more of the parameter values.

15. The apparatus of claim 14, wherein:

the request comprises an identifier of the first device; and the at least one processor is further configured to:

load permissioning information from the storage unit, the permissioning information being generated by a second device associated with the data exchange, the permissioning information comprising the identifier of the first device and data specifying at least one of an access permission or an operational permission granted to the first device by the second device;

based on the permissioning information, establish a permission of the first device to initiate the data exchange, the established permission being granted to the first device by the second device; and in response to the established permission, perform the operations that verify the occurrence of the triggering event associated with the data exchange.

16. The apparatus of claim 15, wherein:

the triggering event corresponds to a death of a user of the second device;

the first signal further comprises documentary data associated with a document that verifies the death of the user; and the at least one processor is further configured to:

transmit a portion of the documentary data to, and receive a response from, a computing system associated with the document via the communications unit; and verify the occurrence of the death of the user based on the response received from the computing system.

17. The apparatus of claim 15, wherein:

the second device is configured to perform operations that compute each of first commitment values based on a corresponding one of the parameter values and a corresponding random number, and that apply the first digital signature to the parameter values and first commitment values, the first commitment values comprising homomorphic Pedersen commitment values;

the information associated with the data exchange further comprises the corresponding random numbers; and the at least one processor is further configured to:

apply a second digital signature to at least a portion of the information characterizing the data exchange; and generate and transmit, via the communications unit, a second signal to the first device that includes the information associated with the data exchange and the second digital signature.

18. The apparatus of claim 17, wherein:

the second signal comprises additional information that causes the first device to execute one or more application programs, the one or more executed application programs performing operations that: (i) verify the first and second digital signatures; (ii) in response to the verification of the first and second digital signatures, compute second commitment values representative of corresponding ones of the parameter values; and (iv) establish a consistency between the first and second commitment values; and the at least one processor is further configured to receive, via the communications unit, a third signal from the first device, the first signal comprising the verification data, and the verification data confirming the verification of the first and second digital signatures and the established consistency between the first and second commitment values, the verification data comprising countersigned commitment values.

19. The apparatus of claim 18, wherein:

the at least one processor is further configured to generate and transmit, via the communications unit, a fourth signal to a computing system that includes the verification data, transaction data characterizing the initiated data exchange, and a third digital signature applied to the verification and transaction data; and the fourth signal comprising additional information that causes the computing system to execute instructions included within a distributed ledger, the executed instructions causing the computing system to perform operations that, in response to a verification of the third digital signature, generate an element of distributed ledger that includes the verification data, the transaction data, and the third digital signature.

20. The apparatus of claim 14, wherein the at least one processor is further configured to:

receive, via the communications unit, a second signal from a second device that includes the information associated with the data exchange;

in response to a verification of the first digital signature, store the information within a portion of the storage unit and apply a second digital signature to commitment data that includes the first commitment values and a second commitment value representative of the first digital signature; and generate and transmit, via the communications unit, a second signal that includes the commitment data and the second digital signature to a computing system, the first signal comprising additional information that causes the computing system to execute instructions included within a distributed ledger, and the executed instructions causing the computing system to perform operations that, in response to a verification of the second digital signature, generate an element of distributed ledger that includes the commitment data and the second digital signature.

* * * * *